(12) United States Patent
Pettitt et al.

(10) Patent No.: US 7,164,397 B2
(45) Date of Patent: Jan. 16, 2007

(54) DISCRETE LIGHT COLOR PROCESSOR

(75) Inventors: Gregory S. Pettitt, Rowlett, TX (US); Donald B. Doherty, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 646 days.

(21) Appl. No.: 10/675,194

(22) Filed: Sep. 30, 2003

(65) Prior Publication Data

US 2005/0068464 A1 Mar. 31, 2005

(51) Int. Cl.
- G09G 3/28 (2006.01)
- G09G 5/02 (2006.01)
- G02B 26/08 (2006.01)

(52) U.S. Cl. .......................... 345/63; 345/694; 359/212

(58) Field of Classification Search .................. 345/63, 345/593–605, 690–697; 359/212–214
See application file for complete search history.

(56) References Cited

U.S. PATENT DOCUMENTS

| | | | |
|---|---|---|---|
| 4,275,413 A | | 6/1981 | Sakamoto et al. |
| 5,061,049 A | | 10/1991 | Hornbeck |
| 5,233,385 A | * | 8/1993 | Sampsell ................... 355/35 |
| 5,264,927 A | * | 11/1993 | Miyoshi et al. ............. 358/527 |
| 5,280,277 A | | 1/1994 | Hornbeck |
| 5,623,281 A | | 4/1997 | Markandey et al. |
| 5,726,718 A | | 3/1998 | Doherty et al. |
| 5,768,410 A | * | 6/1998 | Ohta et al. ................. 382/162 |
| 5,777,589 A | * | 7/1998 | Gale et al. ..................... 345/84 |
| 5,903,323 A | * | 5/1999 | Ernstoff et al. ............. 348/771 |
| 6,061,049 A | | 5/2000 | Pettitt et al. |
| 6,088,016 A | * | 7/2000 | Wilde ........................ 345/605 |
| 6,266,105 B1 | * | 7/2001 | Gleckman .................. 348/743 |
| 6,310,591 B1 | | 10/2001 | Morgan et al. |
| 6,342,898 B1 | | 1/2002 | Pettitt |
| 6,396,465 B1 | * | 5/2002 | Nakagiri ...................... 345/69 |
| 6,445,505 B1 | * | 9/2002 | Morgan ...................... 359/618 |
| 6,801,214 B1 | * | 10/2004 | Moriwaki et al. ........... 345/600 |
| 2003/0164839 A1 | * | 9/2003 | Shih et al. .................. 345/601 |

FOREIGN PATENT DOCUMENTS

WO  WO 02/03687 A2  1/2002

OTHER PUBLICATIONS

Younse, J.M., "Mirrors on a Chip," IEEE Spectrum, Advanced Technology Displays, (Nov. 1993) pp. 27-31.

* cited by examiner

*Primary Examiner*—Richard Hjerpe
*Assistant Examiner*—M. Fatahiyar
(74) *Attorney, Agent, or Firm*—Charles A. Brill; Wade James Brady, III; Frederick J. Telecky, Jr.

(57) ABSTRACT

Methods and apparatus for use with a discrete bit display system such as a DLP® display system for increasing brightness by using secondary light bits (such as spoke bits that are otherwise wasted). The light available from the secondary bits is distributed over the entire input/output dynamic range by determining the maximum possible output and then defining the dynamic output range from zero to that maximum range in response to the full range of the input signals.

87 Claims, 14 Drawing Sheets

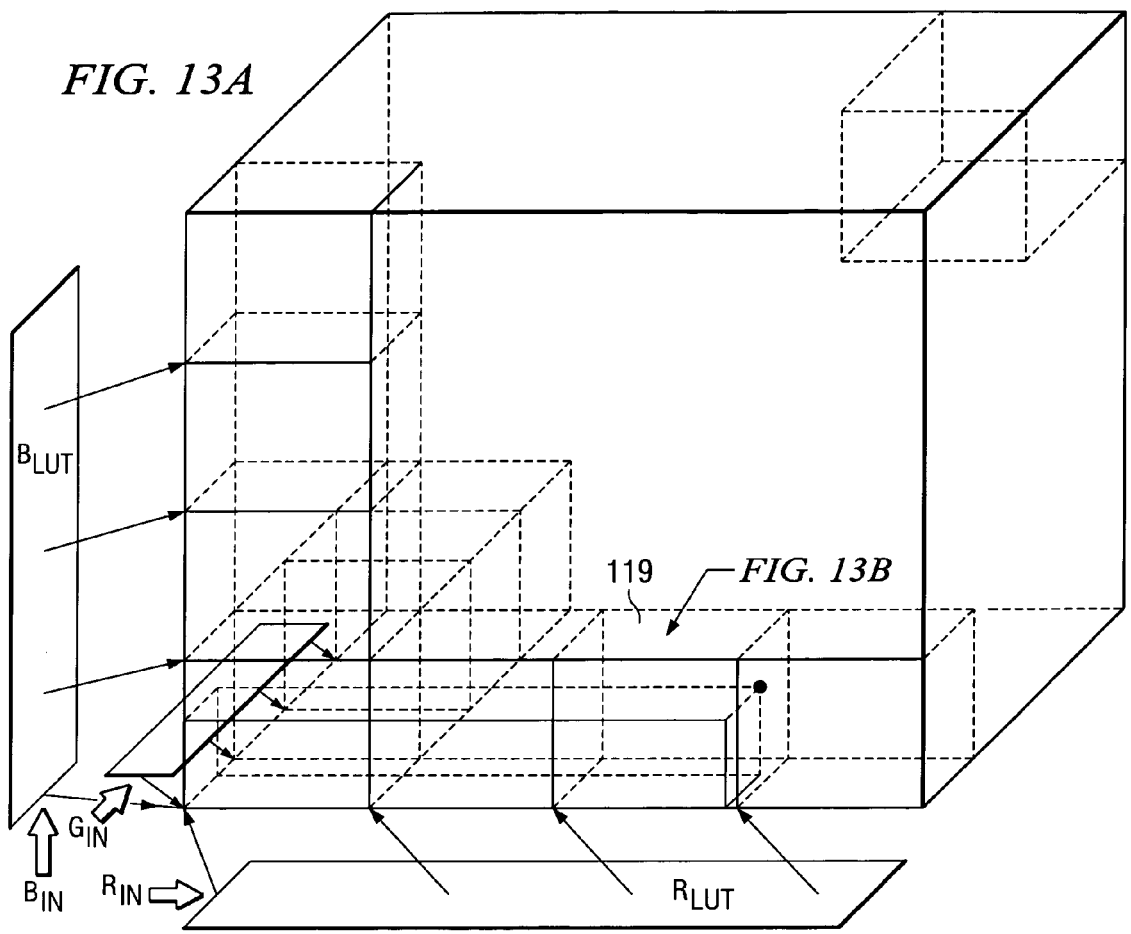
*FIG. 13A*
*FIG. 13B*
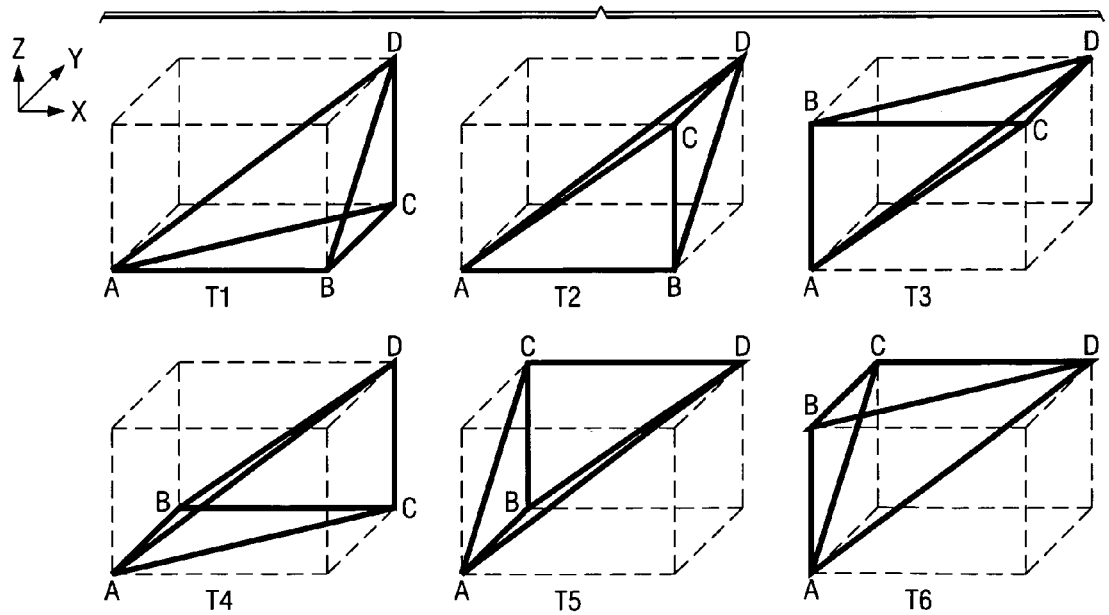
*FIG. 14*

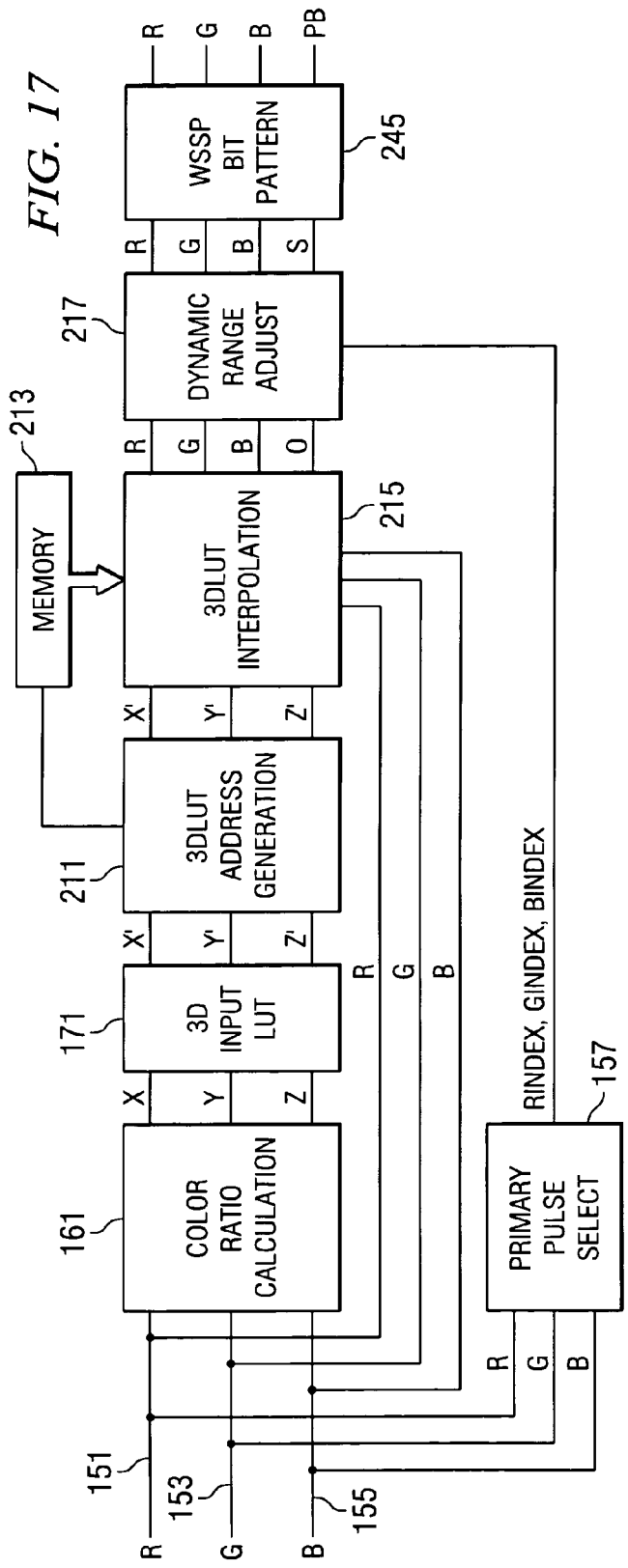
FIG. 17
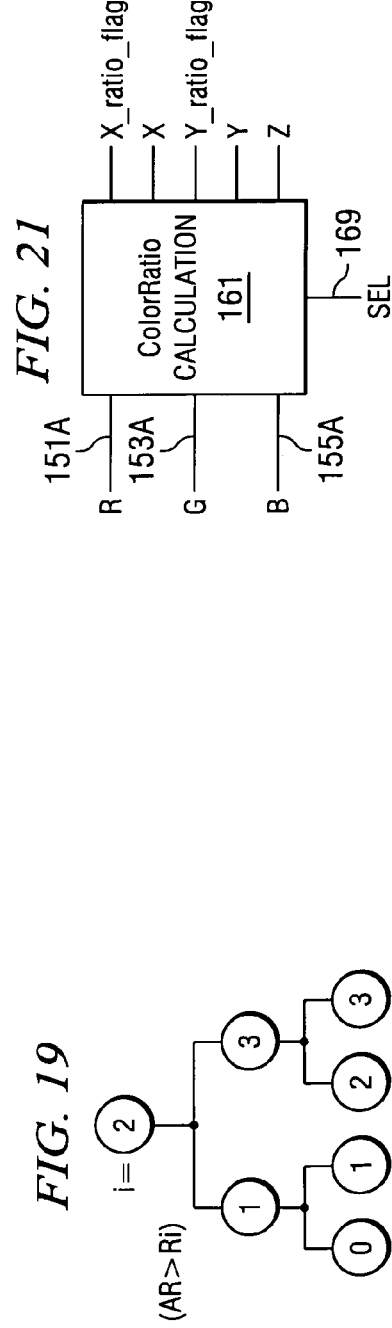
FIG. 21
FIG. 19

FIG. 24

DISCRETE LIGHT COLOR PROCESSOR

TECHNICAL FIELD

This invention relates to the field of digital image displays using pixel on-time during a frame to produce gray-scale images, and more particularly to a method of increasing image brightness or intensity beyond the system's normal dynamic range by using the light normally wasted.

BACKGROUND

A new projection display that utilizes reflections from a large array of micro-mirrors (about one million), each mounted above its own semiconductor memory cell and referred to herein as a DMD (digital micro-mirror device) is described in IEEE Spectrum, November 1993, vol. 30, no. 11, written by Jack M. Younse of Texas Instruments Incorporated. The DMD comprises a special light modulator that covers each memory cell of a CMOS static RAM with a movable tiny, substantially square or diamond shaped mirror having an edge dimension on the order of about 17 micrometers. Electrostatic forces controlled by the data in this cell tilt each of the mirrors around a pair of axes either plus or minus about 10 degrees, so as to modulate the light incident on the surface of the mirror.

Other types of image display systems typically create images by emitting or modulating light so that the light forms an array of picture elements, or pixels, which when viewed together form an image. While most light modulators can create multiple intensity levels, a true digital light modulator, such as the DMD cannot. The light reflected from selected ones of the mirrors passes through a projection lens and creates an image on a large screen. Light from the remaining OFF or non-selected mirrors is reflected away from the projection lens and trapped. Without the capability to create multiple brightness levels, digital light modulators such as the DMD array rely on a digital pulse-width modulation scheme to create various intensity levels by turning a modulator element on and off very rapidly.

The portion of time during each video frame that the mirror remains in the on state determines the shades of gray (or color intensity) from black, for zero percent on time, to white, (or bright color) for 100 percent on time. Color may be added by a color wheel or by using two or more DMD's to control or turn a selected set of primary colors on and off.

If the DMD device only has the capability to display a low number of digital bits representing the on and off times there will be a limited number of shades of gray or shades of color, that in turn results in poor video quality.

Intensity, or image brightness, is one of many metrics by which display systems are judged. The importance of these different characteristics varies depending on the particular customer or consumer. Brightness is one metric that is extremely important to purchasers of display systems, and therefore, techniques that will improve modulation brightness are important in pulse-width modulated display systems.

SUMMARY OF THE INVENTION

These and other problems are generally solved or circumvented, and technical advantages are generally achieved, by preferred embodiments of the present invention which provides apparatus and methods for increasing brightness of individual pixels in a digital display system wherein intensity or brightness is determined by combining one or more digital bits for each display frame. The method and apparatus uses non-standard or secondary bits such as spoke bits, which would otherwise be wasted to increase the brightness of a pixel.

In accordance with an embodiment of the present invention, the method comprises defining an output intensity dynamic range between a minimum level and a maximum level, wherein the dynamic range is comprised of a first portion representing an unenhanced dynamic range and a second portion representing a dynamic range enhanced by the secondary bits. An intensity input signal for one or more of the color signals such as red, green and blue ranging from a minimum or zero input level through a threshold input level to a maximum input level is received from a source. The input signal typically represents one of the color input signals making up a digital color TV or computer input signal. A combination of digital bits from a first group of digital bits is selected in response to the intensity or brightness input signal when the brightness input signal ranges between the minimum input level and the threshold input level. A combination of substantially all of the bits of this first group of bits is selected when the input signal is at the threshold level. Typically, the first group of bits will represent 8 binary bits that can be combined for 256 levels of output brightness (e.g., $2^8=256$). A combination of digital bits that includes at least one bit of a non-standard or secondary group of bits as well as selected bits of the first group of bits is selected for input signals that range between the threshold level and the maximum input level. The secondary bits are typically spoke bits that include various hues of green, magenta and yellow. A selected output intensity level of a pixel of the display within the first portion of the dynamic range is generated in response to a combination of digital bits selected from the first group of digital bits. The output intensity will be at a maximum in the first portion when the combination of selected digital bits includes all of the digital bits of the first group. Similarly, a selected output intensity level of a pixel of the display within the second portion of the dynamic range is generated in response to a combination of digital bits selected from both the secondary digital bits and the first group of digital bits.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 14 and 15 illustrate the use of "Tetrahedral Interpolation" with the "volume" of FIG. 12;

FIG. 17 is a block diagram illustrating one embodiment of an algorithm for increasing brightness according to the teachings of the present invention;

FIGS. 18 and 19 illustrate how light pulses applied to the primary colors in the algorithm of FIG. 17 may be used in increase brightness;

FIGS. 20 and 21 illustrate the use of color "gain" according to the embodiment of FIG. 17;

FIG. 24 illustrates a 3D "gain" based LUT;

FIGS. 25, 26 and 27 illustrate "Dynamic Range Adjust" circuitry suitable for use with the embodiment of FIG. 17; and FIGS. 28 and 29 illustrates WSSP (White Secondary Spoke Primary) circuitry suitable for use with the embodiment of FIG. 17.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
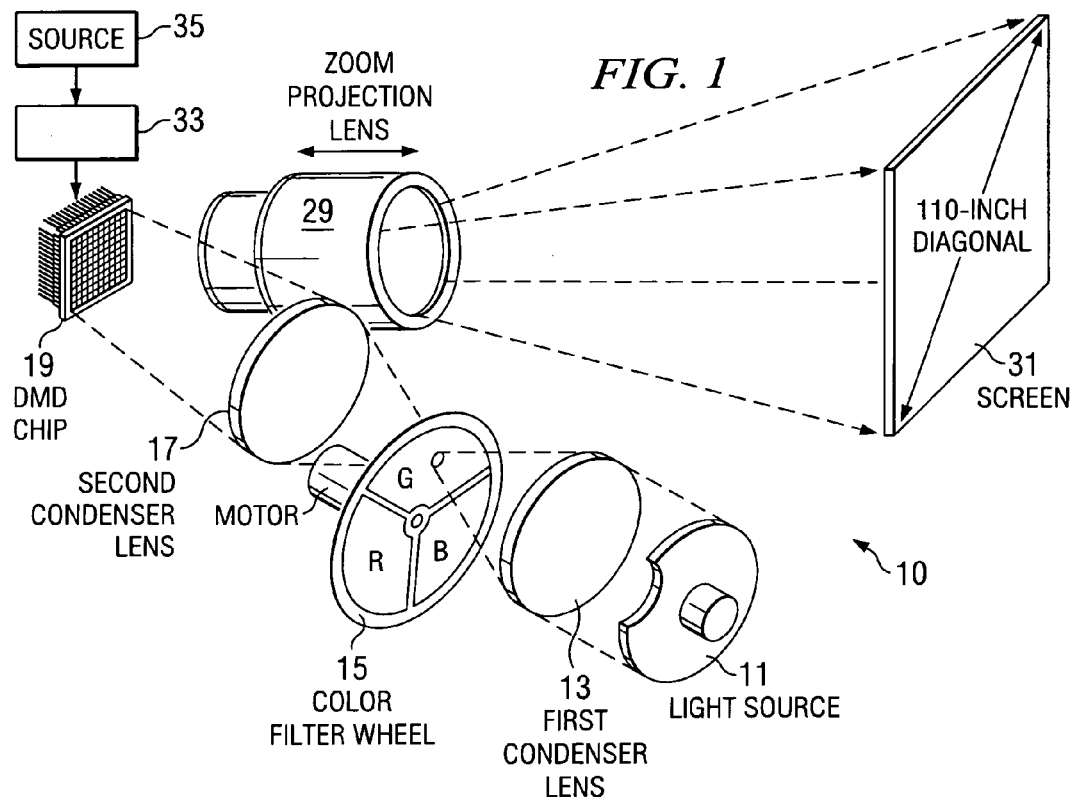
FIG. 1 is an overall block diagram of a prior art Digital Micro-mirror Display System that can benefit from the teachings of this invention.

Referring to FIG. 1, an example of a DMD (digital micro-mirror device) system 10 is illustrated, wherein the light from a light source 11 is applied through a first condenser lens 13 and through a color wheel 15, which will typically rotate no less than about 60 revolutions or 60 frames per second. Alternately, the color wheel 15 may make up to five or six revolutions per frame or about 300–350 revolutions per second. The light passing through the color wheel 15 passes through a second condenser lens 17 onto a DMD chip 19. The DMD chip includes an array (on the order of one million) of tiny mirror elements, or micro-mirrors, where each mirror element is hinged by a torsion hinge and support post above a memory cell of a CMOS static RAM as shown in FIG. 2 and FIG. 3.

Figure 2:
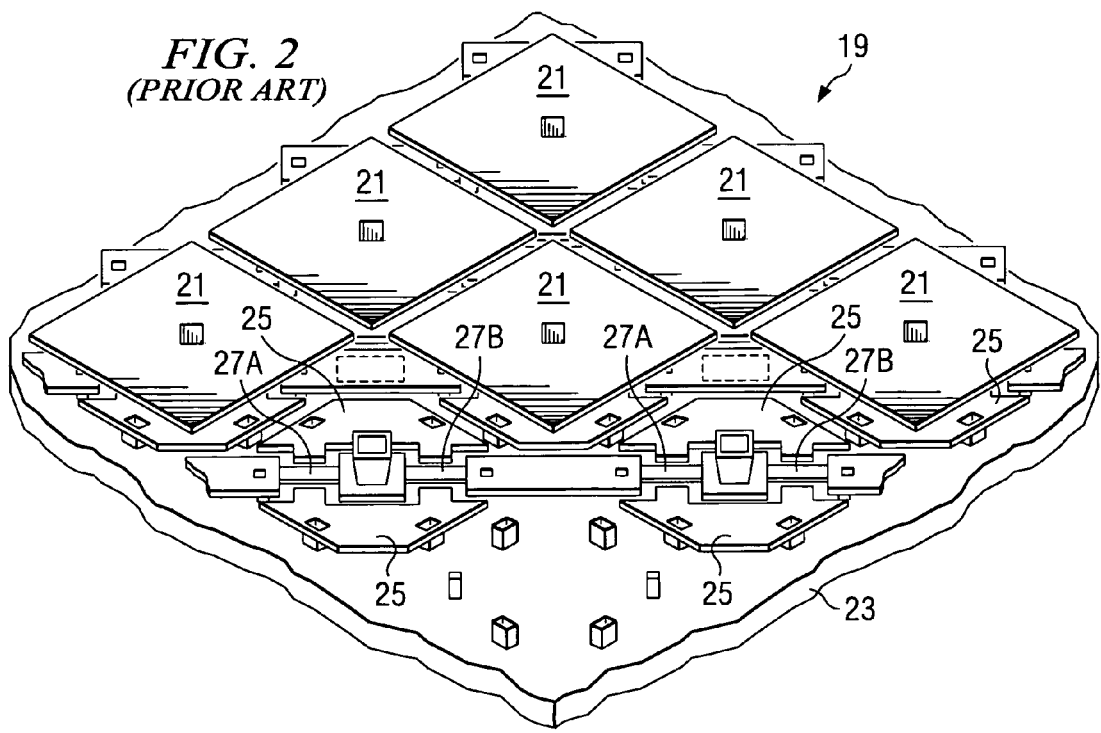
FIG. 2 is a perspective view of a portion of a Digital Micro-mirror Device (DMD) array of the prior art.
Figure 3:
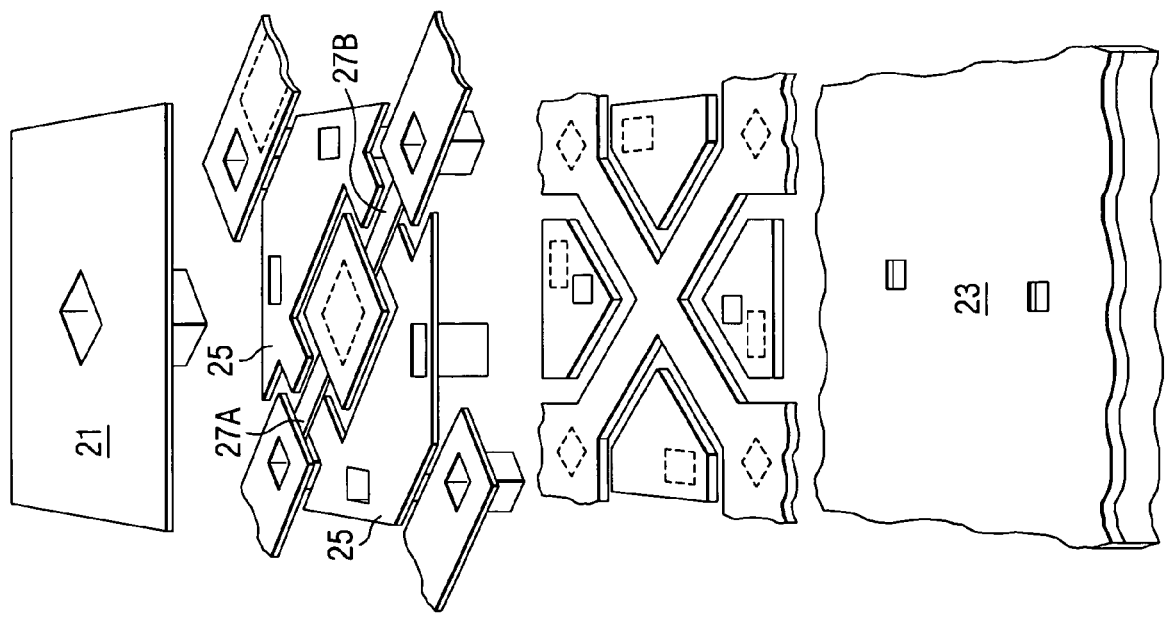
FIG. 3 is an exploded view of the DMD of FIG. 2.

FIGS. 2 and 3 show a portion of a typical DMD array 19 having mirror elements 21 suspended over a substrate 23. Electrostatic attraction between the mirror 21 and an address electrode 25 causes the mirror to twist or pivot, in either of two directions, about an axis formed by a pair of torsion beam hinges 27a and 27b. Typically, the mirror rotates about these hinges until the rotation is mechanically stopped. The movable micro-mirror tilts into the on or off states by electrostatic forces depending on the data written to the cell. The tilt of the mirror is on the order of plus 10 degrees (on) or minus 10 degrees (off) to modulate the light that is incident on the surface. For additional details, see U.S. Pat. No. 5,061,049 entitled "Spatial Light Modulator" and U.S. Pat. No. 5,280,277 entitled "Field Updated Deferrable Mirror Device," both by Larry J. Hornbeck.

Referring again to FIG. 1, the light reflected from any of the mirrors may pass through a projection lens 29 and create images on the screen 31. The DMD's are controlled by electronic circuitry fabricated on the silicon substrate 23 under the DMD array. The circuitry includes an array of memory cells, typically one memory cell for each DMD element, connected to the address electrodes 25. The output of a memory cell is connected to one of the two address electrodes and the inverted output of a memory cell is connected to the other address electrode. Data is provided by a timing and control circuit 33 determined from signal processing circuitry and an image source indicated at 35. Once data is written to each memory cell in the array, a voltage is applied to the DMD mirrors 21 creating a large enough voltage differential between the mirrors 21 and the address electrodes 25 to cause the mirror to rotate or tilt in the direction of the greatest voltage potential. Since the electrostatic attraction grows stronger as the mirror is rotated near an address electrode, the memory cell contents may be changed without altering the position of the mirrors once the mirrors are fully rotated. Thus, the memory cells may be loaded with new data while the array is displaying previous data.

Figure 4:
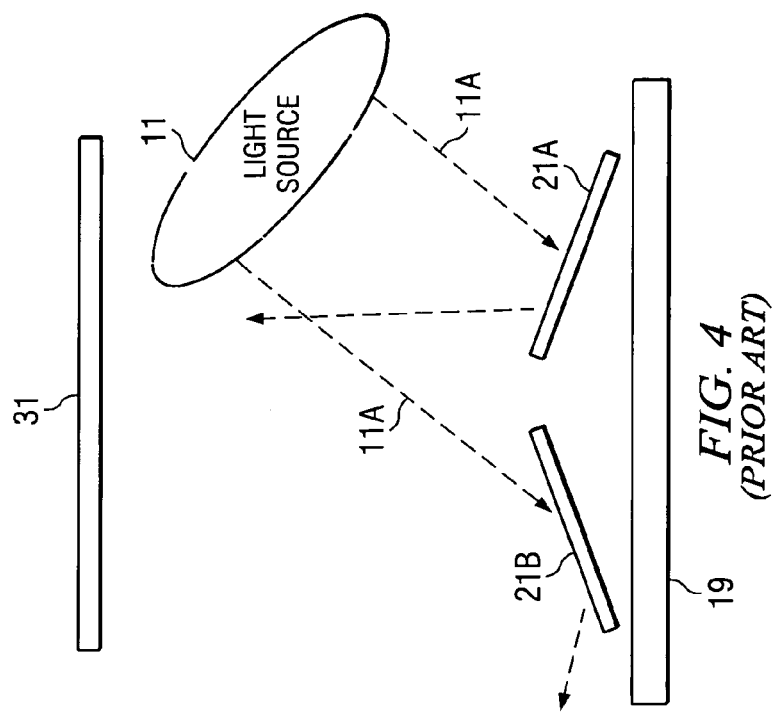
FIG. 4 is schematic representation of the bi-stable operation of two mirrors of the DMD array of FIG. 2.

DMD arrays are typically operated in a dark-field mode. In one embodiment of dark-field operation shown in FIG. 4, light 11a from light source 11 is focused on DMD array 19 and strikes the DMD array 19 at an angle. According to the example shown in FIG. 4, when tilted or rotated to an ON position as indicated by mirror 21a, light incident the mirror 21a will be reflected and focused onto a viewing screen 31 or image plane where it will form part of the image. If a mirror 21b is rotated away from the light source to an OFF position, light incident the mirror 21b will reflect away from the viewing screen 31 and will not form part of the image.

Light incident ON and reflected from a DMD mirror forms an illuminated dot on the viewing screen 31 for every mirror 21 that is rotated to the on position. Each of these dots represents one picture element, or pixel, which is the smallest individually controllable portion of an image. Using a large array of these tiny mirrors, an image is created by selectively turning some mirrors to the on position while turning some to the off position, thereby creating a pattern of illuminated dots on the viewing screen.

To create multiple intensity or brightness levels, or shades of gray, the duty cycle of each mirror is altered by rapidly rotating the mirror on and off in response to a series of digital pulses having different widths or durations (i.e. PWM) that are determined by the timing and control circuit 33 from the received image signal. This creates a pixel that, during a specific period of time or "frame," consists of a series of illuminated periods and non-illuminated periods that will vary for each pixel. The viewer's eye integrates these periods for each pixel so that the viewer perceives a collection of illuminated dots, each having a brightness or intensity proportional to the duty cycle or ON time of the mirror.

Full-color images are created by rapidly displaying multiple monochromatic images, typically red, green, and blue, and once again allowing the viewer's eye to integrate a series of these different color images. Depending on the cost and required image quality of the projection system, the monochromatic images may be projected sequentially or simultaneously. As stated previously, the portion of time during which the video frame that a mirror remains in the on state determines the shade of gray (or color brightness). The time duration in which the cell is on is determined by a series of data bits (such as 8 bits, 16 bits, etc.) sent to that cell. The color wheel 15 is divided into different color sectors, such as for example only red, green and blue. It should also be understood that there could be more than three colors on the wheel. Furthermore, to boost brightness a clear sector (white light) could be used. However, simply including more white light will also result in saturation of colors. It should also be understood that it is not necessary that each of the color sectors of the wheel be of the same size. It is not even necessary that there be the same number of sectors for each color.

Figure 5:
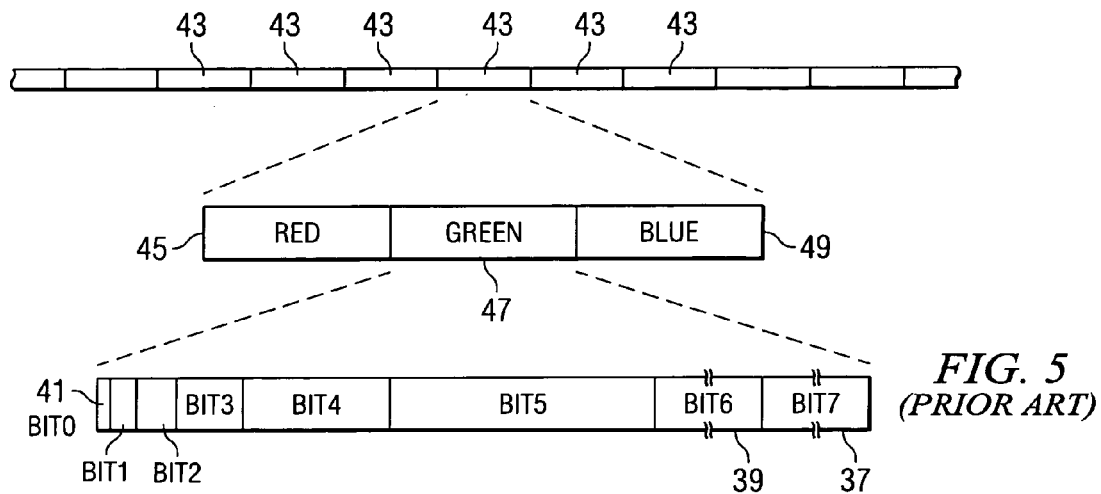
FIG. 5 is a timeline showing a simplified representation of the subdivision of display periods used by the display system of FIG. 4.
Figure 6:
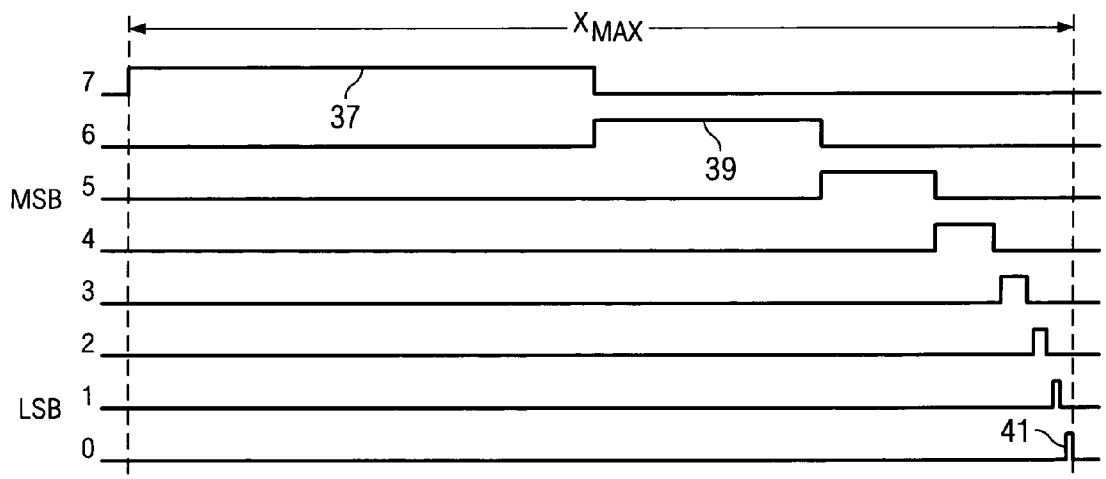
FIG. 6 is a timing diagram illustrating the on-time of MSB and LSB.

In the color wheel example of FIG. 1, the maximum red for a pixel would be when a micro-mirror reflects light (red) for the full period or position of rotation that light is projected through the red sector. The minimum color (black) would be when the light incident to a specific micro-mirror remains OFF during a full rotation of the color wheel 15. That is, the mirror would not be reflecting any light received from the color wheel and the lens, etc. at all to the screen 31 during the color cycle or frame. The intensity resolution in a pulse-width modulation (PWM) scheme is limited by the response time of the DMD mirrors. The total time available to display a color frame and the least time required to turn a mirror to the ON state and back to OFF state defines the resolution of present systems. In an arrangement limited to 8 bits, the most significant bit, as illustrated in FIG. 5, is the 7th bit having reference number 37 with that bit representing the widest ON time, the 6th bit having reference number 39 as the next widest ON time, and the 5th bit representing the third longest ON time, etc., all the way down to the least significant 0 bit, which is represented by the shortest time period 41. As an example only, and again referring to FIG. 5 and assuming that a sequential color DMD system has a fixed period of X-msec (milliseconds) available for a specific primary color in the display frame, the max on time would be X which is the sum of all 8 bits for an 8 bit binary PWM system. The least ON time (i.e., other than zero sec ON time (i.e. black color) would occur when "only" the least significant bit 41 is turned "on."

More specifically, FIG. 5 illustrates a timeline showing a typical sequential color binary pulse-width modulation data stream. In FIG. 5, each frame period 43 is comprised of three sub-frames 45, 47 and 49, where each sub-frame is a period in which the color wheel 15 of FIG. 1 outputs red green and blue monochromatic light. Each sub-frame is further subdivided into bit periods as was discussed above. During each bit period the DMD mirrors are set to the ON or OFF position depending on the image data written into the DMD by the timing and control circuit 33 of FIG. 1. As discussed above, FIG. 5 shows a simple bit sequence for one "binary" 8 bit color word of a three color image system in which each bit is displayed for twice the period of the previous bit. That is, bit "1" is twice as large as bit "0," and bit "7" is twice as large as bit "6." However, it should be noted that FIG. 5 is for illustration only and bits "6" and "7" have been truncated to save space on the drawing. In addition, some applications may not be binary. For example, the order in which the bits are displayed may be altered, or the longer bit periods may be divided into two shorter, non-consecutive bit periods. Furthermore, some systems split one or more of the color sub-frames such that some of the data bits are displayed during one sub-frame while others are displayed in another sub-frame.

As mentioned above, image brightness is often of utmost importance to consumers of video displays. Thus, insufficient brightness of a display is simply unacceptable. Therefore, it is highly advantageous to increase the intensity or brightness of a display, and one method is to adjust the bit display periods to more efficiently utilize the frame period. For example, by foregoing purely binary bit periods, brightness may be maintained without exceeding the allowable bit display period.

The brightness or intensity of a display is of particular importance, and may dominate all other considerations. For example, for a presentation of data such as charts, etc., color or hue is used primarily to distinguish numbers, data sets or line depth, etc. Consequently, the actual color of a chart or number, etc., is not of great importance so long as it provides clear delineation from an adjacent number, bar graph, or chart, etc. Therefore, other than avoiding unpleasant or irritating colors, faithful representation or reproduction of colors is of minor importance for this type of display if the brightness of the presentation is sufficient that it can take place in a room with full light. On the other hand, for other types of displays such as movies, faithful reproduction of colors is extremely important. Although brightness or intensity is also important, the problem of brightness is typically handled by simply darkening the room when running the display or movie. At least for the present, customers do not expect to watch a movie or most displays in full daylight.

Of course the ideal display will provide sufficient brightness and faithful reproduction of color. Due to many reasons, including cost, heat load, etendue, etc., it is not feasible to simply increase the amount of light available for use with a DMD. For example, the projection lamp used with a DMD display to provide the light remains on all of the time and typically generates a substantial amount of heat that needs to be dissipated. Therefore, if the display also included a substantial amount of pure monochromatic areas, the unused light from the pixels when the color wheel provides a different monochromatic color of light than the selected monochromatic light will be reflected away from the screen and absorbed. Consequently, there can be an unacceptable heat buildup if the projection lamp output is significantly increased.

However, if some of the light that is typically reflected away from the screen by the DMD could be used to boost the brightness of the display while maintaining the proper color, then more of the total available light could be used and the thermal budget improved.

Figure 7A:
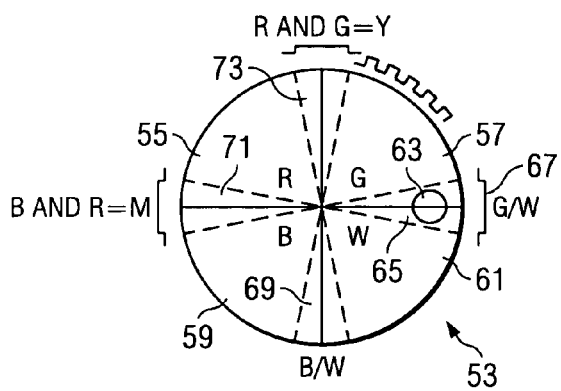
FIG. 7A shows a color wheel with R (red), G (green), B (blue) and W (white) sectors.
Figure 7B:
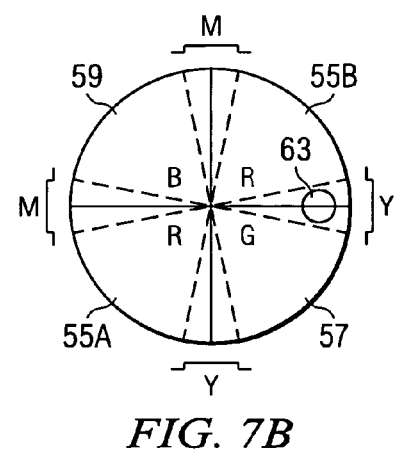
FIG. 7B shows a color wheel with a G sector, a B sector and two R sectors.

As was mentioned above, simply adding a clear sector to the color wheel (white light) and selectively turning on the appropriate mirrors will increase the brightness of the image. However, other techniques for using otherwise wasted light to boost brightness without reducing contrast to an unsuccessful level, or causing other artifacts, have been developed. For example, referring now to FIG. 7 there is shown a color wheel 53 with red 55, green 57, blue 59, and white 61 sectors. FIG. 7 also shows a spot or area 63 on color wheel 53 representing the "footprint" of a light beam projected through a color wheel. Thus, it will be appreciated that since the spot or area of light 63 has an actual diameter or dimension, there will be a transitional portion or spoke 65 of the color wheel when the light is not the same color as one of the color wheel sectors. For example, assuming a clockwise rotation, the wheel 53 will move from a portion of the wheel where only white light is projected through sector 61 to a transitional or spoke area 65 where the white light diminishes and green light increases until the spot 63 is totally over the green sector 57. If the transitional sector or spoke 65 is defined as a single bit 67, it will be appreciated that the composite color for this spoke or transitional sector 65 is not a single sector color but is comprised of green light and white light. In a similar manner, there will also be a spoke 69 composed of blue light and white light, spoke 71 composed of blue light and red light (magenta), and spoke 73 composed of red light and green light (yellow).

As was mentioned above, the color wheel could also include more than one sector of a selected color. For example, the color wheel may include two red sectors, such as sectors 55a and 55b shown in FIG. 7B to reduce an artifact referred to as "color separation." This artifact uses the eye to see a rainbow of colors when the eye moves, and results when colors are not presented to the eye in a rapid enough sequence. Thus, in the embodiment of FIG. 7B, there can be double the number of bits available to show red colors as are available for green and blue. However, in this embodiment, magenta and yellow spokes are available to boost the overall brightness.

Figure 8:
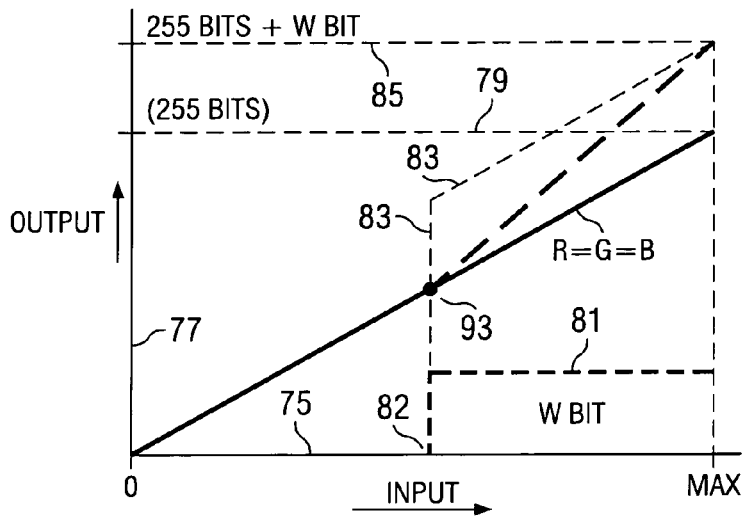
FIG. 8 is an input/output graph of white light with a single large white bit added when an equal value of standard white bits are subtracted to increase brightness without artifacts.
Figure 9:
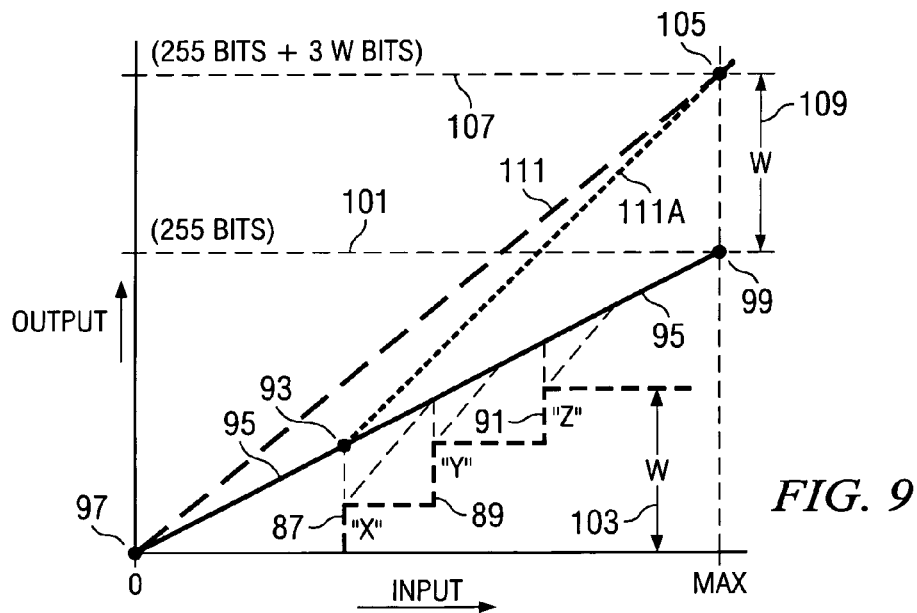
FIG. 9 is an input/output graph of white light with three discrete white bits added to increase brightness.

Referring now to FIGS. 8 and 9, present techniques for using white light and recapturing "spoke" light in an 8 bit system are discussed. FIG. 8 illustrates how a single white bit of light may be added. As shown, the horizontal axis 75 of FIG. 8 represents the input signal for white light and the vertical axis 77 represents the light output. The dotted line 79 represents the maximum light output when all bits (0–255) for the three colors, red, green and blue, are ON thereby combining to create white light. That is, for a basic system where light boosting techniques are not used, line 79 represents the maximum possible light output. However, if for example the color wheel includes a white or other color sector, a non-standard or white bit 81 representing white light could be added to the 255 levels. Of course, if the white sector bit was simply added to the existing 255 bits at some point 82, the brightness increase would be a step function followed by further brightness increases as indicated by dotted lines 83. Such a sudden increase in brightness would create an unacceptable artifact that for most uses would be worse than having insufficient brightness. Therefore, typically non-standard bit 81 is not turned on until the total output level is at least two times the value of the white bit 81. At that point, a portion of the 255 output levels equivalent to the white bit 81 is turned off at the same time the white bit 81 is turned on. Thus, there is no step function increase of the light. Further, all of the light levels that were turned off and any color levels that had not yet been turned on at the time the non-standard bit 81 was added, are available to further increase the light output not only up to the 255 bit level output indicated by dotted line 79, but beyond dotted line 79 up to a second line 85 representing a light output equal to all 255 normal bit levels plus non-standard white bit level 81. Thus, a significant increase in brightness can be achieved.

Unfortunately, as can be seen from FIG. 8, the light increase ramp or dynamic range is not linear and even though there is not a step increase of light when bit 81 is added, there is an inflection point 93 where the white bit 81 was turned on such that the light increase is at a steeper rate than before bit 81 was added. Thus, although providing significant improvement in brightness and a definite improvement over some techniques, this inflection point 93 may also create a noticeable and unacceptable artifact.

Referring again to FIG. 7A and as discussed above, there are non-monochromatic unused light bits or non-standard bits generated during the transitional areas or spokes 65, 69, 71 and 73. In a manner somewhat similar to that discussed above, this "unused" light may also be used to boost brightness. Therefore, in the following discussion, it is assumed that the non-standard bits representing the spokes are combined in the right proportion to produce white light and, it will be appreciated by those skilled in the art that the technique is also applicable to color or hues other than white light such as yellow, magenta and cyan.

Therefore, referring now to FIG. 9, there is shown an input/output light graph of the dynamic range similar to that discussed with respect to FIG. 8 except there are three smaller light bits 87, 89 and 91 rather than the single large light bit 81 of FIG. 8. The process of adding the light bits is the same as discussed with respect to FIG. 8 except equivalent bits are turned off three different times as the three spoke bits are added, and there is still a single inflection point 93 where the first bit is added. It is important to note, however, that even though the total amount of light added in FIG. 9 with the three bits is the same as added in FIG. 8 with a single large bit, the three bits 87, 89 and 91 are added at three different times. More specifically, FIG. 9 shows a typical input/output white (i.e., R=G=B) ramp signal, and how the addition of bits 87, 89 and 91 changes the final light output brightness. As shown, the output/input white ramp or dynamic range without adding the spoke hue bits 87, 89 and 91 is straight line 95 extending from the "0" input 97 to a maximum output value 99 as also indicated by line 101. This is the light that is available if all 8 bits (255 levels) are turned on. Although the input/output line 95 or dynamic range is shown as being a straight or a linear line it will be appreciated that the line is actually a series of 256 tiny "steps." However, a straight line is perceived. Typically, 14 to 17 bits would be required to create enough steps so that the discrete steps could not be seen. However, as will be appreciated by one skilled in the art, we actually have 8 bits+N fractional bits (or 255.xxxxx levels), and by only displaying the integer portion and dithering the fractional portion, the effective presentation to the eye is 14 to 17 bits of resolution.

If the output value of the three bits 87, 89 and 91 added together is equal to "W" as indicated by dimension 103, the total maximum output as indicated by point 105 and line 107 will be equal to the standard R=G=B values indicated by line 101 plus the value of "W" as indicated by dimension 103, and the ideal ramp or even distribution across the dynamic range would be the dashed straight line 111 extending from the starting point 97 to the maximum point 105. However, the first non-standard spoke bit 87 having a value "X" cannot be added until the standard (R=G=B) output value is equal to 2x and consequently the output does not follow the ramp or slope line 111. Instead of following line 111, the resulting output follows the original output ramp line 95 until the first bit 87 is added at inflection point 93 and then follows the ramp line 111*a* to end point 105. Adding the non-standard bit 87 only after the standard (R=G=B) ramp value is equal to 2X allows a value exactly equal to "X" to be subtracted at the same instant spoke bit 87, which has an "X" value is added. Although a substantially reduced artifact at inflection point 93 is still present, there are no additional artifacts caused by the process of subtracting and adding equal values to the ramp. In a similar manner, bit 89 is added where line 95 representing the original ramp signal increases an additional amount "Y" equal to the output value of the second spoke bit 99. At this point, an output amount "Y" is subtracted at the same instant the bit 89, having an output value of "Y" is added. Similarly, the spoke bit "Z" is added after the output has increased an additional amount equal to the value "Z."

Although the above-described process of adding the non-standard bits 87, 89 and 91 provides the desired increase in brightness without a very noticeable artifact as was discussed with respect to FIG. 8, there is still an artifact that occurs due to the rate increase of light output at inflection point 93. The inflection point 93 still exists when the algorithm is used because the addition of the bits 87, 89 and 91 are not distributed over the first portion of the input/output ramp. As was discussed above, it should also be appreciated that the same process of adding brightness can also be used with respect to the secondary colors cyan, yellow and magenta, as well as white.

From the above discussion, it is seen that a primary difficulty with the presently used algorithm is that the gain of the white (or secondary color) can only be used after the non-standard discrete spoke bit is turned on. This is because the present algorithm can only subtract from the RGB signals. If it is allowed to add to the RGB signals, then the yellow to white ramp (which has red and green at full on throughout the ramp) would not be able to show the increase to the R and G signals because they are already at maximum. The resulting discontinuity would also occur at inflection point 93 where the first discrete bit is turned on.

Although the above discussion was with respect to "white" light, the process, of course, increases the full color spectrum. However, the problem remains that an inflection point, such as the inflection point 93, will occur with respect to the three primary colors as well as with "white" light. Consequently, there are colors or hues that cannot be exactly reproduced using the above algorithm.

Figure 10A:
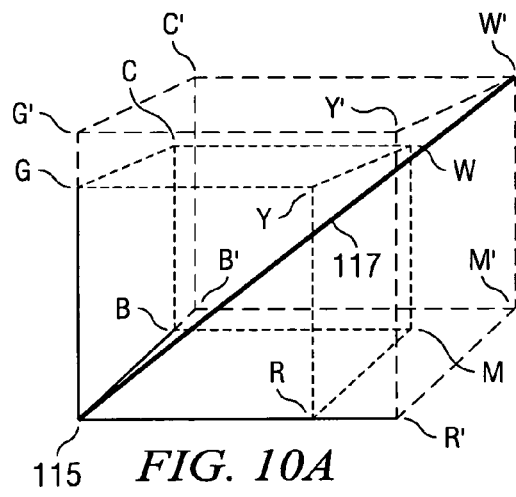
FIG. 10A and FIG. 10B illustrate the addition of discrete secondary bits to increase brightness according to a prior art algorithm.

FIG. 10A is a "RGB" color "cube" indicating this problem. As shown, the basic RGB system (i.e., no spoke bits added) is represented by the smaller cube having corners or points 115, R (red), G (green) B (blue), Y (yellow), C (cyan), M (magenta) and W (white). The larger cube 115 or R', G', B', Y', C', M' and W' represent a presently unattainable "perfect" color distribution using secondary or non-standard bits to increase brightness. It will be appreciated that the white light is along the diagonal 117 extending from the 0, 0 point 115 to the W' point. However, because the "rate change" in brightness begins at the inflection point and is not spaced over the entire input, only portions of the larger cube, as shown in FIG. 10B, can be realized using the existing prior art algorithm.

Figure 10B:
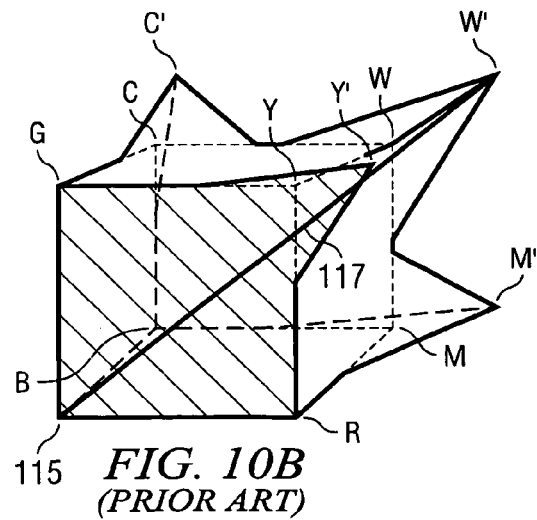

Referring to FIG. 10B, it can also be seen that the increased brightness cannot be realized at those corners of the small cube that represent only basic colors. This is illustrated by the increased areas or pyramid-shaped portions shown in dotted lines in FIG. 10A at the C, Y, M and W corners of the cube and the absence of such pyramid-shaped portions at the basic R, G, and B corners. This is because there must be enough light of each of the RGB colors making up the desired color to match the secondary color light or non-standard bit being turned on. Since each of the non-standard secondary or spoke bits will include at least two of the basic colors and since a display of a single basic color will not include the other two basic colors, there is nothing to subtract from and consequently the secondary or spoke bit cannot be added without altering the hue of the display. Therefore, an algorithm that would create a light boost by applying the additional non-standard discrete light bits such as the spoke bits over the largest part possible of the color gamut is needed. Further, to reduce PWM (pulse-width modulated) artifacts caused by subtraction of the discrete white, spoke or secondary color bits for the RGB levels, the algorithm should avoid turning on those bits until the RGB signals are at a high intensity level.

Figure 11:
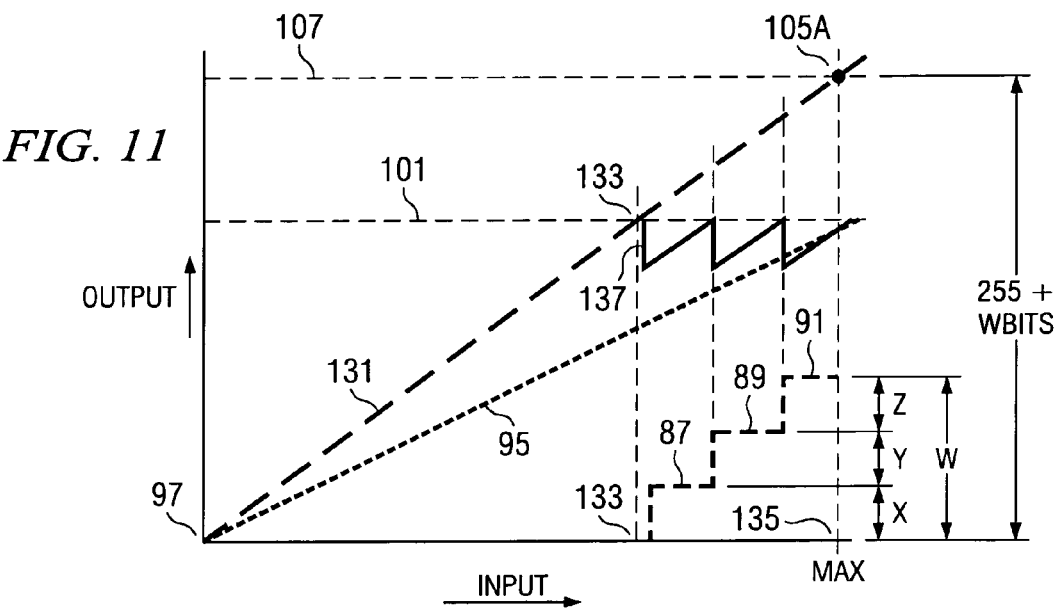
FIG. 11 illustrates the addition of discrete secondary bits to increase brightness according to the present invention.

These advantages are accomplished according to the present invention by calibrating the maximum gain that can be applied to each of the R, G and B signals when the non-standard discrete spoke bits are used. Then, when the required R, G, B signals exceed the maximum level of the dynamic range available from the standard 8 bits, the discrete spoke secondary color (or white) bits are substituted. This process may be better indicated by referring to FIG. 11 which again shows the addition of three white bits. As shown, FIG. 11 is somewhat similar to FIG. 9 except the spoke bits are not added until the output has reached its nominal dynamic range (i.e., all 8 bits or 255 levels are ON). Elements of FIG. 11 that are the same as in FIG. 9 carry the same reference numbers. For example, secondary or spoke bits 87, 89 and 91 are to be added to the standard (0–255) RGB bits which result in a maximum intensity output indicated by dotted line 101. However, to avoid an inflection point and the corresponding artifacts as was discussed with respect to FIG. 9, the maximum possible output value (or dynamic range) of the 8 bits plus the non-standard spoke bits 87, 89 and 91 is determined. This maximum value at point 105 is also indicated at line 107. The necessary gain factors for the output to each input value (assuming white light and that R=G=B) to provide a straight line 131 at a constant rate from beginning point 97 to maximum output 105*a* is then computed as will be discussed in detail hereinafter. However, it is seen that the light output as a function of the input reaches the maximum (dynamic range) value possible from the standard RGB bits as indicated at line 101. It is specifically noticed that the maximum light output as indicated at line 101 is reached well before the input actually calls for a maximum output as occurs at point 135. Thus, so long as the input signal stays below the value at point 133, the system operates at much higher output without adding any additional bits. However, if an input light signal is received that is greater than that at point 133, the system will be at a maximum (i.e., saturated) if there are no non-standard secondary bits, pulse or spoke, are available. Thus, according to the present invention, when an R, G or B signal reaches its dynamic range (i.e., line 101 in FIG. 11) discrete non-standard spoke or secondary color bits are added as the equivalent value in standard bits (i.e., appropriate ones of the 0–255) is subtracted. As shown in FIG. 11 at point 133 on the input (horizontal) axis, the signal output represented by line 131 has reached its full dynamic range. Therefore, as an example only, a selected group of 255 standard bits that is equivalent to bit 87 which has a value of "X" is subtracted or turned off at the same time bit 87 is added as indicated by reference number 137. Thus, the bits that were turned off are now available to add back in as the input signal is increased to an even greater value. In a similar manner, bit 89 having value "Y" and bit 91 having a value "Z" are subtracted so that at the maximum input value indicated at point 135 on the horizontal axis, the output value will be at point 105a or the output level indicated by line 107. Thus, from a "0" input value to the maximum input value identified by reference number 135, the output provides a linear gain without an inflection point up to the value 105a or level 107. Therefore, according to the present invention, the light generated during the transitional areas or spokes can selectively be added to the pixels during a display frame to increase brightness or intensity substantially without creating artifacts.

Figure 12:
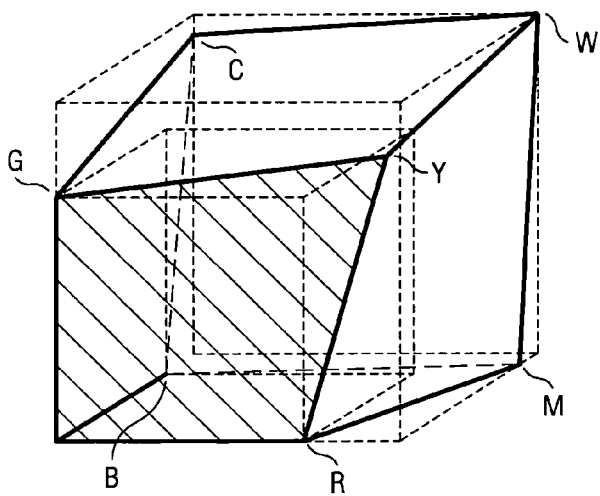
FIG. 12 represents a color "volume" using single dimension LUTs (lookup tables) to determine the inputs to be provided when secondary or spoke bits are used to increase brightness according to FIG. 1.

The above discussion was with respect to white light. However, it should be appreciated that the gain factor must be adjusted for each of the system's primary colors according to the input signals location in the RGB color cube, to be discussed, such that when the input signal is near the white diagonal (i.e., R≈G≈B), the gain can be the maximum value as just discussed. However, when the input signal is near a pure or basic primary color, such as an R, G or B signal, the gain will remain around unity. The primary signals can be increased in the same manner as white if a region of the color wheel has light that is made up of only the pure color, but can change over time (i.e., a lamp pulse) or changes are difficult to predict due to manufacturing tolerances (e.g., neutral density filters on a color wheel). A gain can be applied to the primary color, and these primary color bits can be substituted so as to provide a primary color boost. Consequently, instead of the ideal situation represented by a larger color cube as indicated by dotted lines in FIG. 12, the available gain is represented by the heavy lines which do not define a true cube. That is, the gain is unity for the primary RGB colors but increases to maximum for white light. There will also be substantial increases for the yellow, cyan and magenta colors but these increases will not be as great as the increases available for the pure white light. However, it should also be appreciated that colors other than RGB could be selected as the "primary colors." For example, if yellow, cyan and magenta were selected as the primary colors, the gain for these colors would be unity, whereas the intensity of the red, green and blue colors would be increased. In any event, it can be seen that the available color and intensity of the system represented by the heavy lines in FIG. 12, although not as great overall as the larger cube, still covers a substantially greater portion of the color spectrum and is a significant improvement over the system represented in FIG. 10B as is obvious by comparing the figure of 10B with the figure indicated by heavy lines in FIG. 12.

Figure 13B:
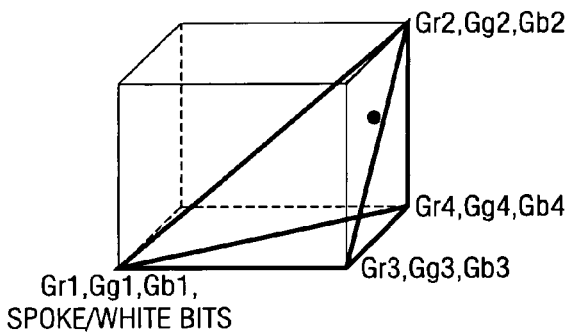
FIG. 13 illustrates a 3D (three dimensional) LUT having red, green and blue single dimension inputs.

One embodiment of the present invention uses a 3D LUT (lookup table) to store the "gain factor" on a 3D grid of points covering the entire RGB color volume or cube. Referring now to FIG. 13, there is a representation of the 3D LUT. The "large cube" represents the complete set of values in the "cube" and is subdivided into smaller "cubes" as shown. The term "cube" is used for convenience since three dimensions of the 3D structure may not be equal. For example, the sides or three dimensions of the sub-cubes are illustrated as being of equal length. However, it is not necessary that the three dimensions be equal. Therefore, the proper term is "parallel piped" rather than cube. Further, it should be understood that although for explanation purposes FIG. 13 illustrates only four "cubes" or parallelepipeds of equal size along each of the R, G and B axes for a total of 64 sub-cubes, that there may be substantially more than four cubes along each axis (such as for example, 16 cubes) and in fact, they may be parallelograms having different sizes or dimensions along all, one or a single dimension. The input signals determine a sub-cube within the large cube and then a final output gain value is determined by interpolation (typically linear interpolation). Thus, for each color of each of the input signal values, a gain is calculated. Thus, a gain value gR is calculated for red, a gain value gG is calculated for green and a gain value of gB is calculated for blue. The size and starting point of each "cube" (parallelepiped) is determined by an input one-dimensional LUT on each of the three inputs. Thus, the LUT maps the input of the appropriate sub-cube within the large cube and can be either a full-sized LUT, as determined by the presence of the input signal, or it may be a smaller LUT which is associated with appropriate hardware (e.g., a binary search engine) to find the entry point used to map into the 3D LUT. The embodiment using a binary search table uses less memory and requires only four stages of search and will be discussed in detail hereinafter.

It should also be understood that "input formats" to the 3D LUT other than RG and B may be used. For example, a "color ratio" input format discussed hereinafter, as well as intensity formats, which provide for hue solutions and intensity wrapping may be used. Intensity formats provide an easier method to maintain a constant hue overall intensity level.

Referring again to FIG. 13, there is illustrated an example wherein a specific RGB input locates or determines that cube 119 contains the appropriate gain factor for the input signal. Thus, once the appropriate sub-cube (e.g., cube 119 in the present example) is determined, the actual gain value must be determined. Since the number of values in the LUT is finite and the number of input RGB signal possibilities may be substantially infinite, the final value for the appropriate gain may be determined by interpolation. Tetrahedral interpolation has been found to be particularly suitable with the present invention. A complete and full discussion of Tetrahedral interpolation may be found in U.S. Pat. No. 4,275,413 issued to Sakamoto, et al. on Jun. 23, 1981. However, for purposes of the present invention, Tetrahedral interpolation slices each of the sub-cubes (actually a parallelogram) into six Tetrahedrons illustrated in FIG. 14. As was mentioned above, the RGB values determine the appropriate sub-cube. However, the RGB values also may be used to determine the appropriate one of the six Tetrahedrons. Once the appropriate Tetrahedron is determined, the gain factor for the red, green and blue signals may then be calculated using a three dimensional linear interpolation.

Figure 15:
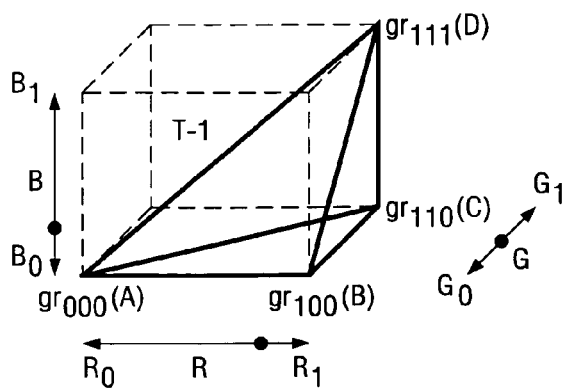

For example, in the example of FIG. 13, it is assumed that Tetrahedron T1 of FIG. 14 was selected based on the red, green and blue inputs. FIG. 15 is another view of the Tetrahedron T1 with each of the R, G and B axis illustrated and the input value indicated on each axis. Thus, using the value or point shown in FIG. 14, the output gain for red can be computed from equation 1.

$$gr(x,y,z) = gr_{000} + (gr_{100} - gr_{000})(R-R_0)\backslash(R_1-R_0) + (gr_{110} - gr_{100})(G-G_0)\backslash(G_1-G_0) + (gr_{111} - gr_{110})(B-B_0)\backslash(B_1-B_0)$$

Equation 1:

Thus, only the four red gain values $r_{000}$, $r_{100}$, $r_{110}$ and $r_{111}$ are used in the interpolation. Therefore, these values, along with $R_0$, $G_0$ and $B_0$ values along with reciprocal of the cube size can be stored in the input LUT such that multiplication can be used in the calculation rather than division. Consequently, the interpolation equations for the red gain can be written in general notation as shown in equation 2 that will support a location in any of the six Tetrahedron.

$$gc(xyz) = gc_{000} + c_1(R-R_0)\backslash(R_1-R_0) + c_2(G-G_0)\backslash(G_1-G_0) + c_3(B-B_0)\backslash(B_1-B_0)$$

Equation 2:

The same process is used to provide the same type general equations for determining the gain for the green signal and the blue signal.

The $c_1$, $c_2$, $c_3$ terms are determined from Table 1. A gain, gc, is computed for each color where c=red, green and blue using the gains stored in the 3D look-up table. This gain is then applied to the input RGB values.

TABLE 1

| Tetrahedron | Test | $C_1$ | $C_2$ | $C_3$ |
|---|---|---|---|---|
| T1 | $\Delta R > \Delta G > \Delta B$ | $gc_{100} - gc_{000}$ | $gc_{110} - gc_{100}$ | $gc_{111} - gc_{110}$ |
| T2 | $\Delta R > \Delta B > \Delta G$ | $gc_{100} - gc_{000}$ | $gc_{111} - gc_{101}$ | $gc_{101} - gc_{100}$ |
| T3 | $\Delta B > \Delta R > \Delta G$ | $gc_{101} - gc_{001}$ | $gc_{111} - gc_{101}$ | $gc_{001} - gc_{000}$ |
| T4 | $\Delta G > \Delta R > \Delta B$ | $gc_{110} - gc_{010}$ | $gc_{010} - gc_{000}$ | $gc_{111} - gc_{110}$ |
| T5 | $\Delta G > \Delta B > \Delta R$ | $gc_{111} - gc_{011}$ | $gc_{010} - gc_{000}$ | $gc_{011} - gc_{010}$ |
| T6 | $\Delta B > \Delta G > \Delta R$ | $gc_{111} - gc_{011}$ | $gc_{011} - gc_{001}$ | $gc_{001} - gc_{000}$ |

One implementation of the above-described algorithm uses a floating point number representation to reduce the amount of required memory. Therefore, three floating point number formats have been developed for use with the algorithm of this invention. It should be understood, however, that the use of a floating point format is not necessary to make the present interpolation method work. For example, scaled integer math could also be used, and that the described floating point format represents only one method of complementing the 3D LUT storage and interpolation.

The first format, FP_7e5_20 is a non-negative floating point number with a normalized 7 bit mantissa and a 5 bit exponent biased by 20. The value equals 0.0 when the exponent equals 0, and the range of numbers for this format is 1.90735e−6 to 4080.

Figure 16:
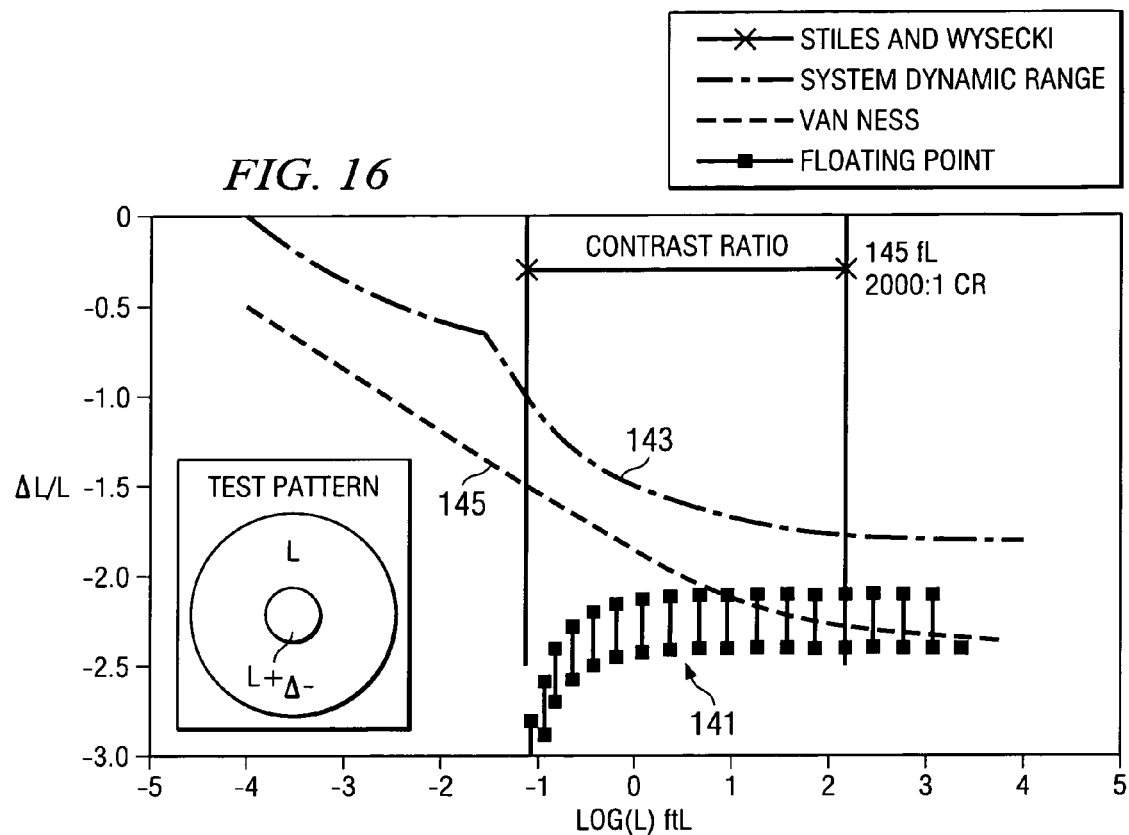
FIG. 16 illustrates the use of different floating point formats suitable for use with the present invention.

The second format, SFP_7e5_20 is a signed version of the FP_7e5_20 number representation discussed above, and the third format PFP_7e2_1 is a positive floating point number with a normalized 7 bit mantissa and 2 bit exponent biased by 1. There is a "no 0" code. The range of numbers for this format is 0.5 to 7.96875. This format will be used when multiplying by FP_7e5_20 format numbers. The floating point format provides a natural perceptual performance in much the same way as provided for the degamma process. FIG. 16 shows the ability to discriminate between each increment of the floating point format 141. As an example, a system having 145 fL peak white with 2000:1 contrast ratio is used. Curve 143 is a traditional limit of luminance differences. As can be seen, the floating point format is well below this level. The van Ness curve 145 provides a lower bounce on perceptual performance given the image is a sign wave grading tuned to have maximum perceptibility at a given luminance level. Only the upper code levels exceed this threshold. One additional mantissa bit would move below this level.

Referring now to FIG. 17, there is shown a block diagram of the circuitry 33 for providing a complete algorithm for operating a DMD display system incorporating the present invention. As shown, R, G and B input signals 151, 153 and 155 are provided to a primary pulse select circuit 157 to be discussed hereinafter for each pixel of a display frame.

As will be appreciated by those skilled in the art, an energy pulse or burst is typically applied periodically to a high intensity light source to increase the life of the light source. The energy pulse must of course be precisely scheduled so that it can be anticipated and compensated for or an artifact of a momentary increase in a single color of light would occur. One easy way to handle the increased light would be simply to turn off all of the mirrors during the burst of increased light. However, rather than wasting this increased light output by pulsing the light source when all the mirrors are off, the timing of the energy pulses according to this invention are controlled by circuitry 157 so that the light increases or gains are scheduled to occur as a selected one of the primary R, G or B wheel sectors are intersecting the light beam from source 11 as shown in FIG. 1. Alternatively, multiple energy pulses could be selected during different color wheel sectors. It is also noted that since the light output of these extra pulses can change or be changed over time, the strict scheduling of the light pulse allows the increased light output to be calibrated to assure the proper bits are selected.

Thus, the required gain for the input signal is determined, and the output signal generated with one to four primary color pulse bits, and when the color signal(s) required by the output signals will exceed the brightness level available by use of all of the normal or primary bits, the pulse bits may be turned on and used to achieve the necessary dynamic range as requested by the input signal.

Figure 18:
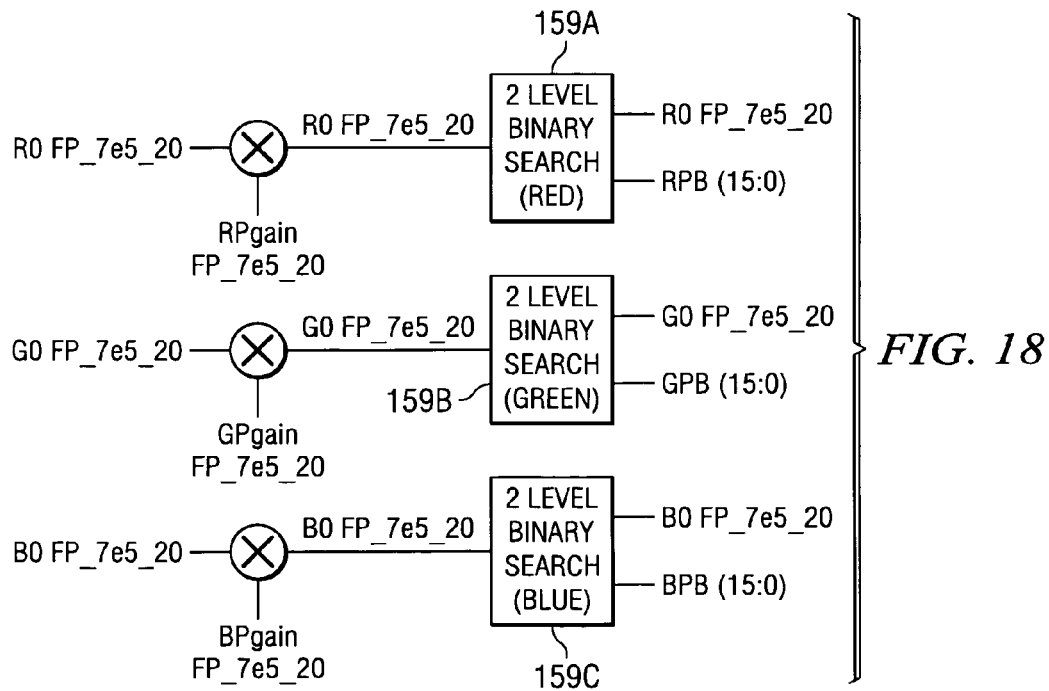

As shown in FIGS. 18 and 19, up to four levels of color increase can be specified for each of the primary colors by the "Two Level Binary Search" circuits. The determined gain needed by each primary color is applied to the input video signal. A lookup table with $N^P$ storage locations, (where "N" is the number of bits in the input signal, and "P" is the number of primary colors), could be used to directly determine what gain value, if any, is appropriate. Instead however, a 2-level binary search is used. The hardware binary search looks for primary pulse bit levels, which exceed the delta amount over the nominal 255 bits. The level is subtracted and the patterning information is passed to the WSSP (White Secondary Spoke Primary) block. Thus, it is seen that a two-level binary search results in four possible outputs as illustrated by the binary search tree for the red pulse as shown in FIG. 19.

Of course, as discussed above, a straightforward method for indexing the 3D LUT would be to use the R, G and B values directly. However, another method of indexing into the 3D LUT particularly suitable for the present invention is to use color ratios. The color ratios provide a mechanism for dividing the color space into regions, which are not dependant upon the size of the input values. The color ratios are defined as the ratios of the three primary colors and include G/R, B/R, and B/G. It will also be appreciated that the inverse of these ratios, including R/G, R/B and G/B may be used. Therefore, the red, green or blue signals 151, 153 and 155 are also provided to a color ratio calculation circuitry 161. The color ratio calculation circuitry 161 provides the system with the ability to select color ratio indexing into the 3D LUT.

Figure 20:
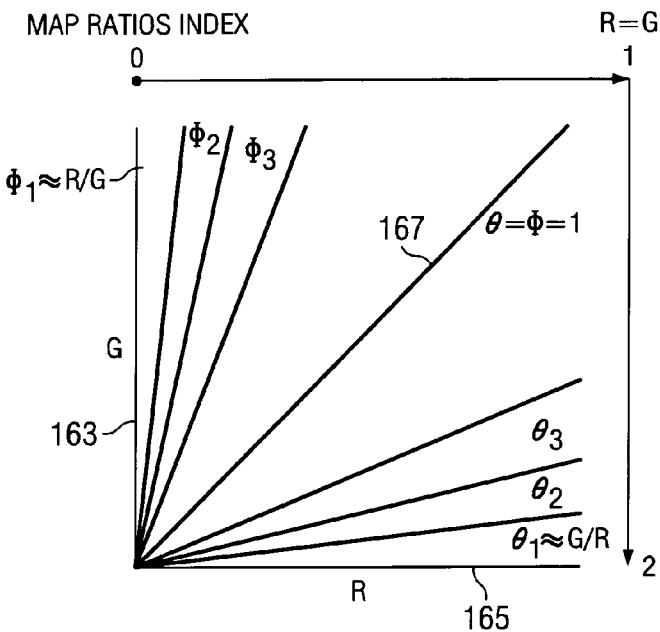

Referring now to FIG. 20, there is shown how the input ratios R/G and /GR may be used to cover the complete spectrum of ratios of these two colors. For example, if only one of the color ratios, such as G/R were to be used, the range of the ratio would be 0 to infinity, which, as will be appreciated, that from a mathematical point of view could present difficulties at the two extremes of the ratios. However, by using the two ratios, the range can be limited from 0 to 1 and 1 to 0. As shown in FIG. 20, the green values are on the vertical axis 163 and the red values are on the horizontal axis 165. Line 167 represents the point where both the red and green values are equal. Thus, if the R/G ratio is equal to $\phi$ (phi) and the G/R ratio is equal to $\theta$ (theta), then line 167 represents the point at which the ratio equals 1:$\theta$=$\phi$=1. The denominator of the ratio is defined to always be the larger of the two numbers. A ratio flag is used to define which ratio is being used. Thus, in order to efficiently cover the color space with points in the 3D LUT, only two ratios are needed along with the maximum of the input RGB signals. At this point, the hardware will evaluate the ratio and set the ratio flag to "1" or "0" depending upon whether the appropriate ratio is R/G or G/R as shown in Table 2. However, since the ratio must take the place of one of the R, G or B signals for indexing into the 3D LUT, the two ratios are merged into a single index value. This may be accomplished by subtracting the G/R ratio or θ value from 2. Thus, R/G or φ ratio will range from "0" to "1" and G/R ratios or θ will range from "1" to "2."

Therefore, referring now to FIG. 21, the three possible results are defined by the common color between the ratios. FIG. 21 shows the color ratio block 161 with a red input 151*a*, a green input 153*a* and a blue input 155*a* as received from "Primary Pulse Select" circuitry 157. The outputs are mapped to three channels including the X channel, the Y channel and the Z channel in response to a selection signal input on line 169 and as defined in Table 3. Likewise, as discussed above, the X and Y ratio flags and the selection input on line 169 are determined as set out in Table 2.

TABLE 2

| sel | X Ratio Flag | Y Ratio Flag |
|---|---|---|
| 0 | 0 | 0 |
| 1 | if G ≦ R → 0 else → 1 | if B ≦ R → 0 else → 1 |
| 2 | if R ≦ G → 0 else → 1 | if B ≦ G → 0 else → 1 |
| 3 | if R ≦ B → 0 else → 1 | if G ≦ B → 0 else → 1 |

TABLE 3

| sel | X | Y | Z |
|---|---|---|---|
| 0 | R | G | B |
| 1 | G/R, R/G | B/R, R/B | max(R, G, B) |
| 2 | R/G, G/R | B/G, G/B | max(R, G, B) |
| 3 | R/B, B/R | G/B, B/G | max(R, G, B) |

Figure 22:
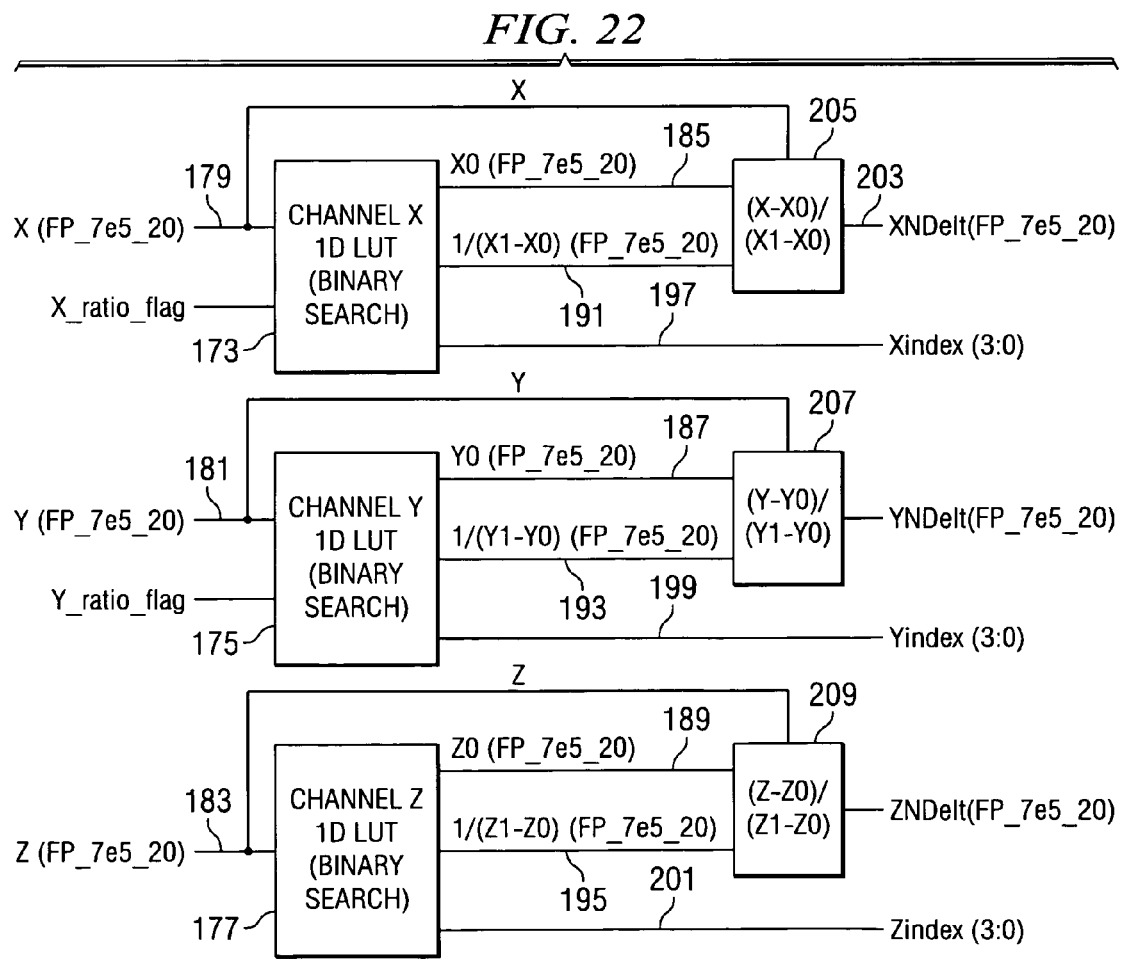
FIGS. 22 and 23 illustrate the use of "gain" based inputs to single dimension LUT's for determining the inputs to a 3D LUT similar to that shown in FIG. 13.
Figure 23:
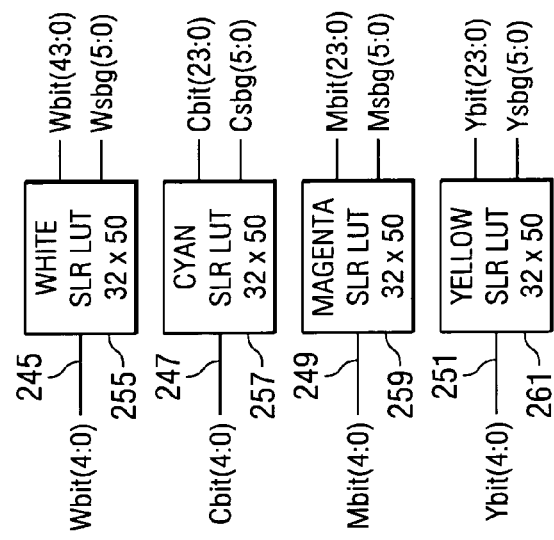

Further, concerning the above discussion related to FIG. 13, three single dimension LUT's are used as the inputs to a three dimensional LUT. In the example of FIG. 13, the three single dimensional LUT's includa a single dimension red LUT, a single dimension green LUT and a single dimension blue LUT. These three single dimension LUT's were used to map into a 3D LUT (three dimensional look-up table). However, according to the embodiment of the present invention shown in FIG. 17, and as was discussed with respect to FIGS. 20 and 21, the R, G and B color signals have been transformed into gR, gG and gB or gain signals for R, G and B and identified as X, Y and Z signals respectively. Therefore, as indicated by the 3D input LUT circuitry 171 of FIG. 17, instead of the three single dimension R, G and B look-up table, the embodiment of FIG. 17 includes three single dimension LUT's 173, 175 and 177, respectively, for the X, Y and Z signals representing the red gain, the green gain and the blue gain signals as illustrated in FIG. 22. The X, Y and Z inputs are on lines 179, 181 and 183, respectively, shown in FIG. 22. The output of LUT's 173, 175 and 177 on lines 185, 187 and 189 are the base cube values such as "X0", "Y0" and "Z0" in the first floating point format discussed above, and the "inverse distance across" the selected cube such as 1/X1–X0, 1/Y1–Y0 and 1/Z1–Z0 on lines 191, 193 and 195, respectively. An "index number" such as $X_{index}$, $Y_{index}$ and $Z_{index}$ are provided on lines 197, 199 and 201. These "index" numbers simply identify the appropriate cube from cube "0" to cube "14" (in a 16 cube embodiment). Cube index number "15" (16th cube) is only used to define the upper limits for points in cube "14" (i.e., the 15th cube). Further, in order to reduce the size of the LUT memory, each of the single dimensions, X, Y and Z LUT's is implemented by using a four stage binary search as indicated in FIG. 23.

The zero indexes of the LUT's are always set to zero. Thus, once the binary search, as indicated in FIG. 23, identifies an index, a normalized delta value "XNdelt" for the "X" circuitry 205 as indicated on line 203 is calculated. This calculated value is the percentage of the step used in the "X" channel. For the "X" channel, the value XNdelt is equal to (X–X0)·(1/(X1–X0)). The process for the Y and Z channels proceed in the same manner and is carried out by circuits 207 and 209. It should be noted that the index search will produce an index in the range of 0 to 14 for proper addressing into the 3D LUT to be discussed hereinafter. Thus, the decision logic (not shown) for the binary search uses the input to the base index to compare logic along with a "table flag" and the "ratio flag" signal as discussed above with respect to the "Color Ratio Calculation" circuitry 161 and illustrated with respect to FIGS. 20 and 21. Table 4 shows the logic process using this input and the flags with respect to the X and Y channels. A similar table is not necessary for the Z channel since "if Zi<X then TRUE else FALSE." Therefore the X and Y channels, the ratio flag and the table flag (stored in the table) are used to determine the logic transversing the binary tree of FIG. 23.

TABLE 4

| X_Ratio_Flag | Table_Flag (i) | Logic |
|---|---|---|
| 0 | 0 | if Xi < X → TRUE else → FALSE |
| 0 | 1 | FALSE |
| 1 | 0 | TRUE |
| 1 | 1 | if X < Xi → TRUE else → FALSE |
| 0 | 0 | if Yi < Y → TRUE else → FALSE |
| 0 | 1 | FALSE |
| 1 | 0 | TRUE |
| 1 | 1 | if Y < Yi → TRUE else → FALSE |

The mapping of 3D LUT cells to memory locations will be described with respect to FIG. 24. Each LUT cell referenced by the X, Y and Z indexes of FIG. 24 corresponds to one memory location identified by a bank number (0 to 4) as the first digit. The first digit or "bank number" is followed by a 3 digit address into that bank. The figure shows some of the cells with their memory locations in the format, "b.aaa" where "b" is the bank number and "aaa" is the address into the bank. For simplicity only a portion of the addresses for the perimeter cells shown in FIG. 24 have numbers or addresses. However, in actual use each cell would include an address. For example, for X=13, Y=0 and Z=5, the address found is 3.258. Thus, the appropriate gain address may be found in bank "3" and address "258." This addressing scheme is arranged so that an incremental cell step in any dimension accesses the next memory bank in Modulo 5 order. As will be appreciated by one skilled in the art, Modulo 5 counting only uses 4 of the 5 memory banks at any one time. Therefore, once a base memory bank is selected, the next 4 banks are used in order with a wrap-around to bank "0." For example, if bank 3 is selected as the base memory bank, the order of the next 3 banks would be 4, 0 and 1.

Figure 24:
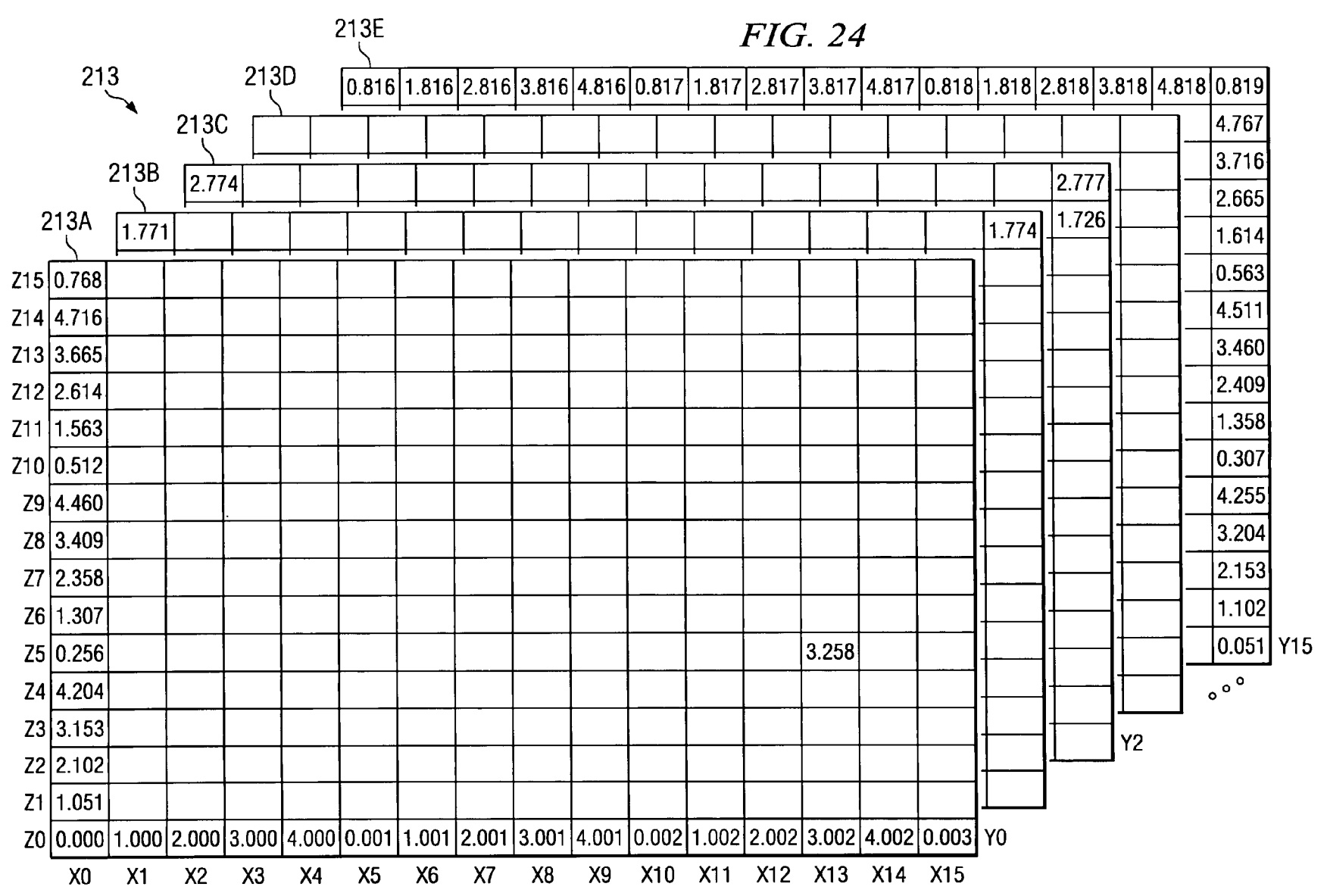

Referring again to FIGS. 14 and 15 along with FIG. 24, for gain interpolation, as shown, the four cells that correspond to the Tetrahedron corners, designated A, B, C and D, are related by a series of three one-dimensional increments. Corner A is the cell identified by the X, Y and Z indexes. Corner B is the cell offset from A by one in the direction of the channel with the maximum normalized delta value. Corner C is the cell offset from B by one in the direction of the channel with the median normalized delta value. Corner D is the cell offset from C by one in the direction of the channel with the minimum normalized delta value. The 3D LUT data for the four tetrahedron corners are thus always in four different memory banks numbered sequentially for A, B, C and D.

The address in the bank changes differently depending on the channel axis direction. Except for bank rollovers (the bank number going from 4 to 0), an increment in the X direction does not change the address. Incrementing in the Y direction adds 3 to the address while the Z direction adds 51. Any time a movement to an adjacent cell causes a bank rollover, an additional 1 must be added to the address.

```
SI = sum of indexes = Xindex + Yindex + Zindex
BankA = bank for corner A = SI mod 5
BankB = (BankA + 1) mod 5
BankC = (BankB + 1) mod 5
BankD = (BankC + 1) mod 5
AddrA = address for corner A = Yindex * 3 + Zindex * 51 + int(SI\5)
AddrB = AddrA +
    [0 if XNDelt is max | 3 if YNDelt is max | 51 is ZNDelt is max] +
    [0 if BankA < 4 | 1 if BankA = = 4]
AddrC = AddrB +
    [0 if XNDelt is med | 3 if YNDelt is med | 51 is ZNDelt is med] +
    [0 if BankB < 4 | if BankB = = 4]
AddrD = AddrC +
    [0 if XNDelt is min | 3 if YNDelt is min | 51 is ZNDelt is min]+
    [0 if BankC < 4 | 1 if BankC = = 4]
```

The 3D LUT interpolation circuitry 215 requires four values form the XYZ cube (similar to RGB cube of FIG. 13) to interpolate the output gain value. The cube size shown in FIG. 24 of the memory 213 of FIG. 17 is set to be 16×16×16. This requires 4096 memory words. Further, the memory 213 for the 3D LUT is arranged into 5 independently addressed banks 213a, 213b, 213c, 213d and 213e with at least 820 words each. One implementation using commonly available memory modules would provide 832 words per bank realized with 3 memories of 512+256+64.

The 3D interpolation requires the normalized delta values used to search the 3D input LUT and the color gains for each color from memory. The normalized delta values are of floating point type, FP_7e5_20, and the gain values are of floating point type, PFP_7e2_1. the resultant gain is of format, FP_7e5_20.

Referring again to the discussion of tetrahedral interpolation of FIGS. 14 and 15, the equation for gain can be restructured to simplify calculations by avoiding negative intermediate results:

$$gc(x,y,z) = gc_A*(10-\text{MaxNDelt}) + gc_B*(\text{MaxNDelt}-\text{MedNDelt}) + gc_C*(\text{MedNDelt}-\text{MinNDelt}) + gc_D*\text{MiNDelt}$$

where $gc_Q$ is the 3D LUT gain for color c and the cube corner Q and MaxNDelt, MedNDelt, and MiNDelt are the maximum, median and minimum normalized delta values, respectively, for X, Y and Z. The cube corner designations A, B, C and D were defined and discussed above with respect to FIGS. 14 and 15 and the 3D LUT Address Generation.

The outputs of the 3D LUT interpolation are an output value for each primary color and a search order control signal retrieved from memory for cube corner A. The output value for a color is that color's input multiplied by its calculated gain value. The search order control signal defines the search order as shown in Table 5.

TABLE 5

| | Search Order | | | |
|---|---|---|---|---|
| Index | First | Second | Third | Fourth |
| 0 | W | C | M | Y |
| 1 | W | C | Y | M |
| 2 | W | M | C | Y |
| 3 | W | M | Y | C |
| 4 | W | Y | M | C |
| 5 | W | Y | C | M |
| 6 | W | Y | C | M |
| 7 | W | Y | C | M |
| 8 | C | M | Y | W |
| 9 | C | Y | M | W |
| 10 | M | C | Y | W |
| 11 | M | Y | C | W |
| 12 | Y | M | C | W |
| 13 | Y | C | M | W |
| 14 | Y | C | M | W |
| 15 | Y | C | M | W |

Figure 25:
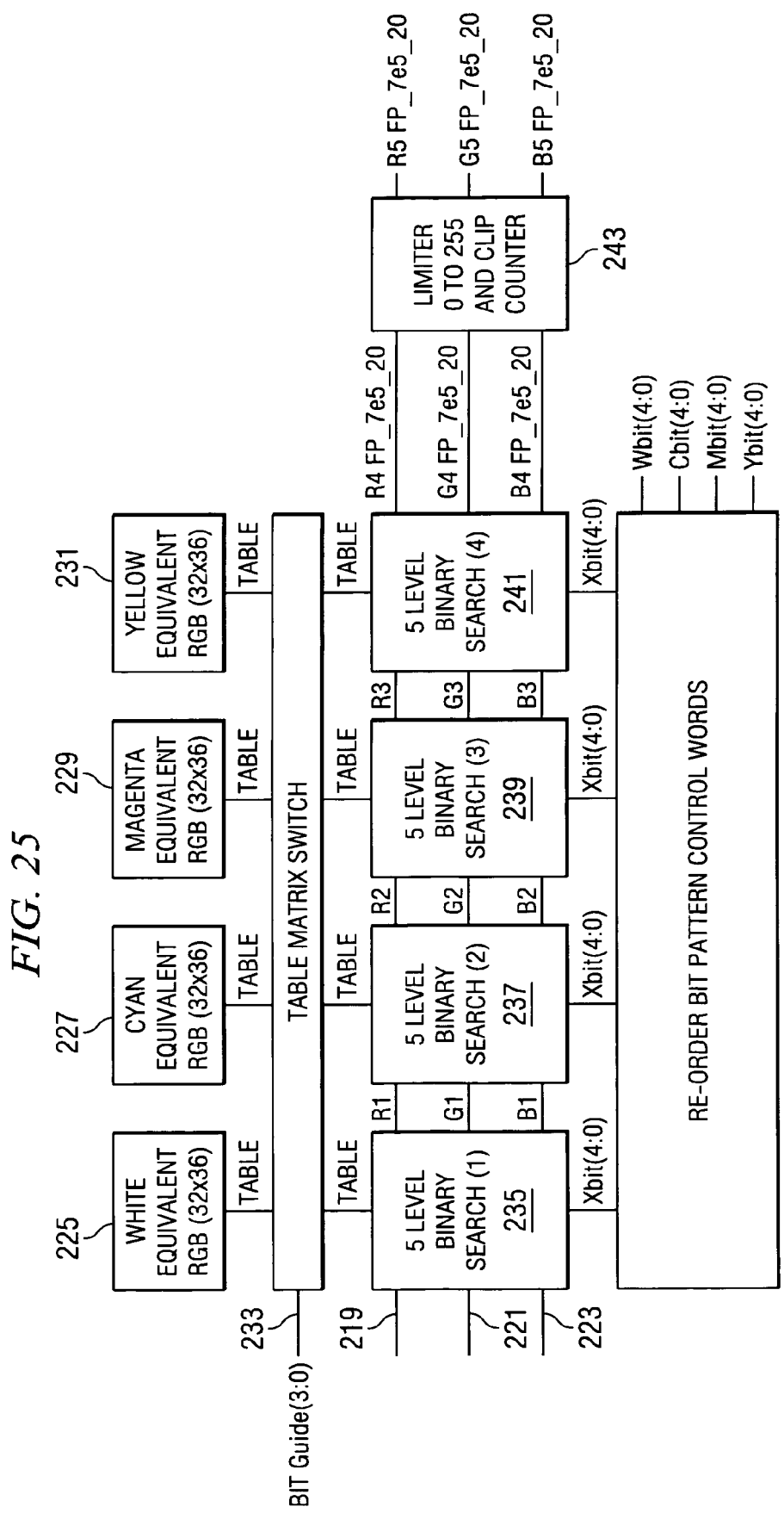

As shown in FIG. 25, the dynamic range adjustment function or circuit 217 looks at the gained R, G and B signals 219, 221 and 223, and if any of these signals are greater than the normal dynamic range of the DMD display (i.e., total of all 0–255 bits), then the out of range signal will be adjusted by the use of a white, secondary, pulse or spoke bit as determined by circuit 217. However, in order to save memory space, all combinations of white, secondary, pulse and spoke bits are not stored. Instead, binary searches are used to locate the largest element in bit groups that can be used to adjust the out-of-range signal. The white (225), cyan (227), magenta (229) and yellow (231) tables are all searched, but they must be searched in a different order for each pixel. This order is driven by the output of the 3D LUT, using the "Bit_Guide" signal 233.

Each of the equivalent RGB tables are filled with values which are in increasing intensity order. For example, for the white table, the levels would be in the order that would be seen turning on along a white ramp. Each of the secondary colors would follow a similar method.

Figure 27:
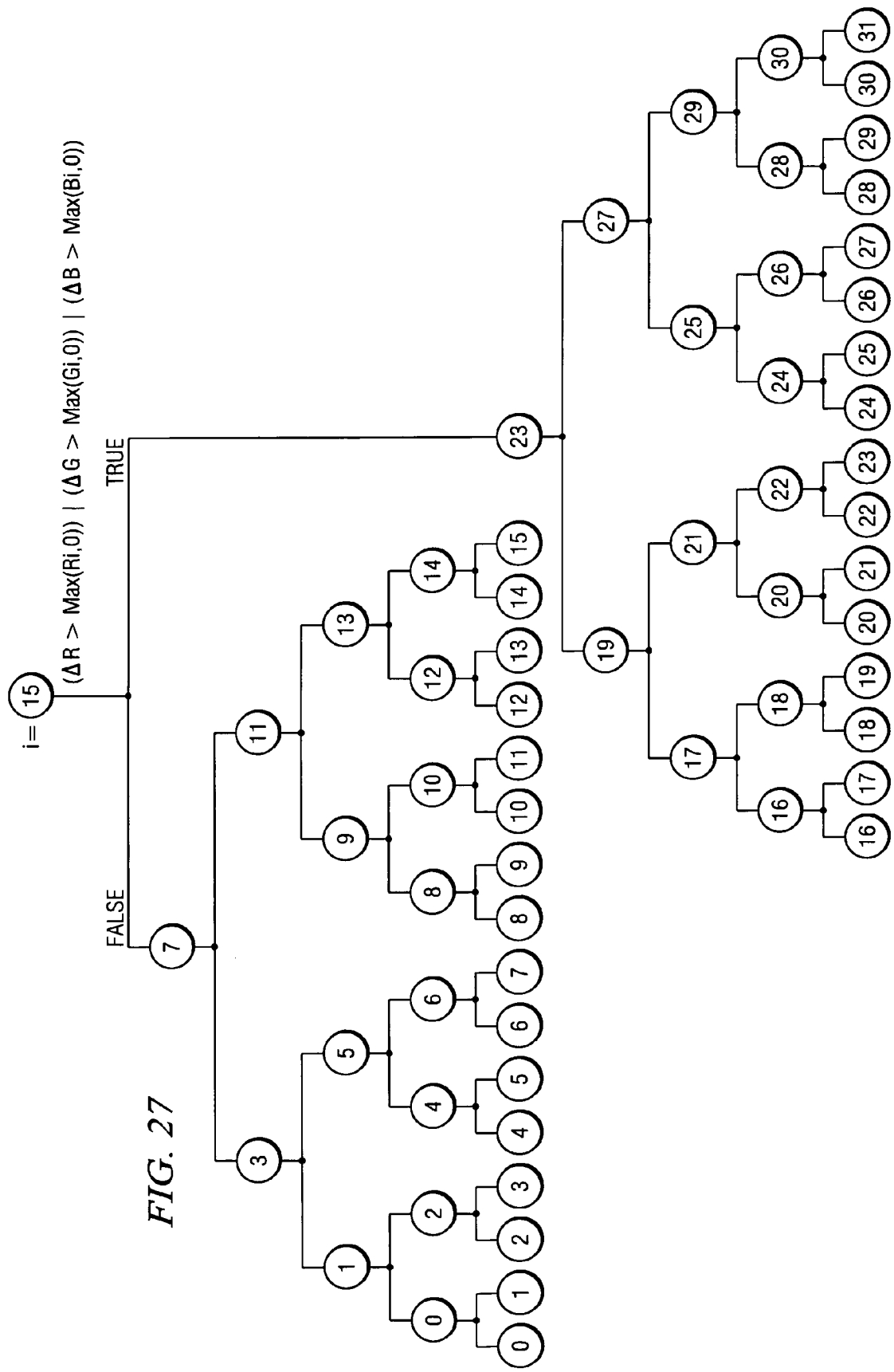

A binary search is conducted through each of the white, cyan, magenta and yellow tables by the first four "5 Level Binary Search" circuits 235, 237, 239 and 241. The block diagram of FIG. 26 illustrates the five level search and FIG. 27 illustrates the five level binary search tree. The order is determined by the search order index. Each stage finds the equivalent R, G, B to be substituted and sets the Xbit number for that color, (where X=W,C,Y,M). The equivalent R, G, B value is subtracted from the R, G, B input and the result is passed to the next search engine.

The output from dynamic range adjust is clipped to be within the range of 0 to 255 by "Limiter" circuit 243. Clip counters are provided on each of the R, G and B channels, which count the number of times the respective channel, limits the output value. These are available to be read by the processor and can be used to determine how well the 3D LUT is mapping the output values or are there error conditions. It can also be used by the dynamic aperture to determine how many values are being clipped in each channel.

Figure 29:
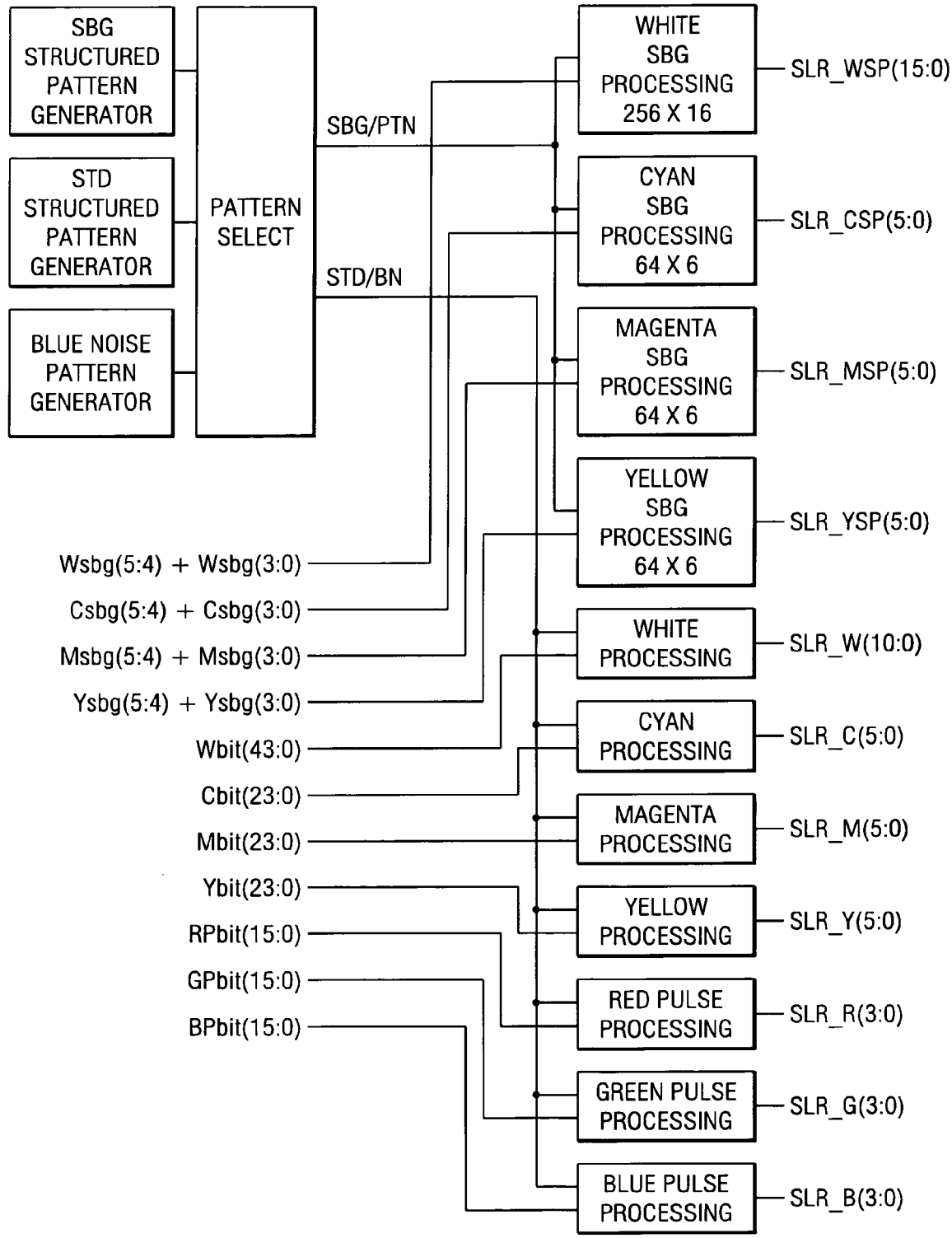

The WSSP (White Secondary Spoke Primary) bit pattern function 245 and illustrated in FIGS. 28 and 29 provides for the creation of individual bit plane signals for the white, secondary, spoke and pulse bits, and operates similarly to spoke light recapture (SLR) of previous techniques. Four 5 bit numbers on lines 247, 249, 251 and 253, (one for each of white, cyan, magenta and yellow respectively) are passed into the functions 255, 257, 259 and 261 from the previous dynamic range adjust function 217. Each individual input drives a 32×50 look-up table from which the signals drive the pattern generator and bit plane generation functions.

The pattern and bit generator function of FIG. 29 provides two basic groups of patterning. The spoke bit group processing (SBG) provides for the patterning of white or secondary color bits in spatial patterns of up to 4×4. The white SBG processing can control up to 16 bits with spatial patterns from 1×1 to 4×4. The secondary color SBG processing each control 6 bits and use patterns from 1×1 or 2×2.

The pure bit processing for white and secondary colors provides for the mixing of bits using spatial/temporal patterns. Either structured or blue noise patterns can be used. The white processing controls 11 bits while the secondary colors control 6 bits each.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, means, methods and steps described in the specification. As one of ordinary skill in the art will readily appreciate from the disclosure of the present invention, processes, means, methods, or steps, presently existing or later to be developed, that perform substantially the same function or achieve substantially the same result as the corresponding embodiments described herein may be utilized according to the present invention. Accordingly, the appended claims are intended to include within their scope such processes, means, methods, or steps.

What is claimed is:

1. In a digital display system comprised of a multiplicity of individual pixels for providing a spot of light wherein the color and brightness of each of said pixels is determined by combining the "on" time of one or more digital bits for a display frame, a method of using non-standard bits to increase brightness comprising:

defining an output brightness dynamic range between a minimum level and a maximum level, said dynamic range comprised of a first portion and a second portion;

receiving an input signal, said input signal ranging from a minimum input level through a threshold input level to a maximum input level;

selecting a combination of digital bits from a primary group of digital bits in response to said input signal when said input signal is between said minimum input level and said threshold input level, and wherein said threshold level requires a combination of substantially all of said primary group of bits;

selecting a combination of digital bits comprising at least one bit from a secondary group of bits and selected ones of said primary group of bits for brightness input signals between said threshold level and said maximum input level;

generating a selected output brightness level of a first pixel of said display within said first portion of said dynamic range in response to a combination of digital bits selected from said primary group of digital bits and wherein said combination of selected digital bits are all selected from said digital bits of said first group; and generating a selected output brightness level of a second pixel of said display within said second portion of said dynamic range in response to a combination of digital bits selected from both of said secondary digital bits and said primary group of digital bits.

2. The method of claim 1 further comprising the step of providing digital bits representing at least three distinct colors of light to each pixel of the system.

3. The method of claim 2 further comprising the step of passing light through different colored sectors of a rotating color wheel to provide said at least three distinct colors of light.

4. The method of claim 2 wherein the three distinct colors are red, green and blue.

5. The method of claim 2 further comprising the step of providing white light in addition to the three distinct colors.

6. The method of claim 2 wherein said step of providing digital bits representing at least four distinct colors.

7. The method of claim 3 wherein the secondary bits are at least one of transitional bits, pulse bits or sector bits of a color different than said three colors.

8. The method of claim 7 wherein said transitional bits are spoke bits.

9. The method of claim 2 wherein the secondary bits include pulse bits, and further comprising the step of calibrating the light output value during said pulse bits.

10. The method of claim 3 wherein said primary group of bits are at least 12 binary bits for each one of said three distinct colors, further comprising the step of providing said secondary discrete bits to the system as the color wheel transitions from one color to another color.

11. The method of claim 1 wherein said input signal requires a brightness output signal from said second portion of said dynamic range and further comprising the step of searching said group of secondary light bits to determine the source of said secondary light bits needed to generate the required brightness.

12. The method of claim 11 further comprising the step of turning on said determined source of said secondary light bits in response to said step of determining that light bits are needed from said source.

13. The method of claim 1 further comprising the step of switching individual mirrors of a digital micro-mirror device ON and OFF in response to digital bits to produce said multiplicity of individual pixels of said display.

14. The method of claim 13 further comprising the step of generating the brightness of an individual pixel of said display by the combination of bits switching said individual pixel ON during a display frame.

15. The method of claim 2 wherein the maximum value of said dynamic range represents the output brightness resulting from combining all digital bits available for a specific color in both said primary and said secondary group of bits.

16. The method of claim 15 wherein said secondary group of bits represents all available pulse bits and transitional bits available to generate said specific color and any sector bits of a color different than one of said three distinct colors.

17. The method of claim 2 wherein said secondary group of bits comprises bits for all three distinct colors and further comprises the step of mapping said discrete light over the entire color space volume.

18. The method of claim 2 further comprising the step of storing R, G and B output signals as a 3D grid of values in a 3D LUT covering the entire color volume and providing an output signal of a selected primary color in response to the input signal.

19. The method of claim 18 wherein said 3D LUT provides $N^P$ storage locations wherein "N" is the number of bits making up the input signal, and "P" is the number of primary colors.

20. The method of claim 1 wherein at least three distinct colors of light are available and further comprising the steps of storing primary color values as a 3D grid of values covering the entire available color volume in a 3D LUT and determining an output primary color value for each of the distinct primary colors in response to the input signal.

21. The method of claim 20 wherein said step of determining a primary color value further comprises the step of inputting the intensity level of the three distinct colors as the input format to said 3D LUT.

22. The method of claim 21 wherein said three distinct colors are R, G and B.

23. The method of claim 20 wherein said step of determining a primary color value further comprises the step of inputting color ratios of the three distinct colors as input signals.

24. The method of claim 23 wherein said color ratios comprise selected ratios of the red, green and blue primary colors.

25. The method of claim 23 wherein the ratio of a first color "F" to a second color "S" is represented by the ratio F/S when the value of "S" is greater than the value of "F," and the raio S/F when the value of "F" is greater than the value of "S."

26. The method of claim 25 wherein the ratio F/S and S/F are merged into a single index value between "0" and "2," such that the ratio F/S is between "0" and "1" and S/F is between "1" and "2."

27. The method of claim 23 wherein said step of inputting signals comprises the step of inputting a first ratio F/S and its inverse S/F where "F" is a first color and "S" is a second color, inputting a second ratio T/S and is inverse S/T where "T" is a third color, and inputting a third signal representing the maximum one of the F, S, and T color values.

28. The method of claim 27 wherein said first color is G, said second color is R and said third color is B, such that the first ratio is G/R and R/G, the second ratio is B/R and R/B and the third signal is the maximum one of the R, G and B color values.

29. The method of claim 20 further comprising the step of mapping into said 3D LUT from three single dimension LUT's.

30. The method of claim 29 wherein said three single dimension LUT's include a red LUT, a green LUT and a blue LUT.

31. The method of claim 29 wherein said three single dimension LUT's represent a red gain (gR), a green gain (gG) and a blue gain (gB).

32. The method of claim 31 wherein said output primary color values will comprise a gain value and said step of mapping into said 3D LUT comprises mapping to a cube or volume of gain values of said 3D LUT and then determining a final gain value by Tetrahedral Interpolation.

33. The method of claim 32 further comprising the step of multiplying said input signal with said determined gain value.

34. The method of claim 20 wherein said three colors of light are produced by passing light through a rotating color wheel.

35. The method of claim 20 further comprising the step of making said secondary group of bits available for use when said input signal is above said threshold input level and requires a gain value in said 3D LUT that will generate an output brightness that is in said second portion of said dynamic range.

36. The method of claim 35 further comprising adjusting the defined output brightness dynamic range for each pixel depending on the available secondary color bits.

37. The method of claim 36 wherein said multiplicity of individual pixels of said display are produced by switching individual mirrors of a digital micro-mirror device ON and OFF in response to digital bits.

38. A method of generating a pixel of light for combining with a multiplicity of other pixels of light to form an image, each of said generated pixels of light having a selected color and intensity determined by the "on" time of a combination of selected color bits, said method comprising the steps of:
   providing a primary group of digital light bits wherein the color represented by each bit of said primary group of light bits being one color selected from at least three colors and having a selected duration;
   providing a secondary group of digital light bits wherein each bit of said secondary group of light bits represents one or more colors of said at least three selected colors and having a selected duration;
   combining all of the available bits of said primary and selected bits of said secondary group of bits to determine the maximum possible output of said selected color of said pixel, said maximum possible output representing an enhanced output dynamic range of said pixel, said enhanced output dynamic range corresponding to a range of input signals between a minimal input level and a maximum input level, and said enhanced output dynamic range further comprising a first portion extending between an output of zero and an intermediate value, and a second portion extending from said intermediate value and said maximum value;
   receiving an input signal defining a color level for each of said at least three selected colors;
   selecting the appropriate light bits from said primary group of light bits in response to said input signal to generate said light pixel of said selected color when said output is in said first portion of said enhanced output dynamic range; and
   selecting the appropriate light bits from said primary group of bits and said secondary group of bits in response to said input signal to generate said light pixel of said selected color when said output is in said second portion of said enhanced output dynamic range.

39. The method of claim 38 further comprising generating a multiplicity of said pixels of light and combining said generated multiplicity of pixels to form an image.

40. The method of claim 39 further comprising continually repeating said method steps to form a series of different images.

41. The method of claim 38 where said at least three selected colors are provided by passing light through different color sectors of a rotating color wheel.

42. The method of claim 38 wherein said step of providing digital bits representing at least three distinct colors comprises the step of providing digital bits representing the colors red, green and blue.

43. The method of claim 38 wherein white light is provided in addition to the three selected colors.

44. The method of claim 41 further comprising the step of providing at least one of a transitional bit, a pulse bit and a sector bit of a color different than said three selected colors.

45. The method of claim 44 wherein the provided secondary bits are pulse bits, and further comprising the step of calibrating the light output value of said pulse bits.

46. The method of claim 41 wherein the three selected colors are red, green and blue.

47. The method of claim 41 wherein said primary group of bits are at least 12 binary bits for each one of said three selected colors, and further comprising the step of providing said secondary discrete bits to the system as the color wheel transitions from one color to another color.

48. The method of claim 41 wherein said secondary group of bits represent available pulse bits and all spoke bits available to generate said color.

49. The method of claim 48 wherein at least three selected colors of light are available and further comprising the steps of storing primary color values as a 3D grid of values covering the entire available color volume in a 3D LUT and determining an output primary color value for each of the three selected colors in response to the input signal.

50. The method of claim 38 further comprising the step of searching said secondary group of digital light bits to determine the source of said secondary light bits needed to generate said light pixel of said selected color and required brightness.

51. The method of claim 50 further comprising the step of turning on said source of said secondary light bits in response to said step of determining that light bits are needed from said source.

52. The method of claim 41 wherein said maximum output value of said dynamic range results from combining all digital bits available for a specific color in both said primary and secondary group of bits.

53. The method of claim 48 wherein said secondary group of bits comprises bits for all three distinct colors and further comprises the step of mapping said discrete light over the entire color space volume.

54. The method of claim 41 further comprising the step of storing R,G and B output signals as a 3D grid of values in a 3D LUT covering the entire color volume and providing an output signal in response to the input signal.

55. The method of claim 54 wherein said 3D LUT provides $N^P$ storage locations wherein "N" is the number of bits making up the input signal, and "P" is the number of selected or primary colors.

56. The method of claim 49 further comprising the step of making said secondary group of bits available for use when said input signal requires a gain value in said 3D LUT that will generate an output primary color value that is in said second portion of said dynamic range.

57. The method of claim 49 wherein said step of determining a primary color value further comprises the step of inputting the intensity level of the three distinct colors as the input format to said 3D LUT.

58. The method of claim 49 wherein said step of determining a primary color value further comprises the step of inputting color ratios of the three distinct colors at the input signals.

59. The method of claim 58 wherein said color ratios comprise ratios of the primary colors red, green and blue.

60. The method of claim 58 wherein the ratio of a first color "F" to a second color "S" is represented by the ratio F/S when the value of "S" is greater than the value of "F," and the raio S/F when the value of "F" is greater than the value of "S."

61. The method of claim 60 wherein the ratio F/S and S/F are merged into a single index value between "0" and "2," such that the ratio F/S is between "0" and "1" and S/F is between "1" and "2."

62. The method of claim 58 wherein said step of inputting signals comprises the step of inputting a first ratio F/S and its inverse S/F where "F" is a first color and "S" is a second color, inputting a second ratio T/S and is inverse S/T where "T" is a third color, and inputting a third signal representing the maximum one of the F, S, and T color values.

63. The method of claim 62 wherein said first color is G, said second color is R and said third color is B, such that the first ratio is G/R and R/G, the second ratio is B/R and R/B and the third signal is the maximum one of the R, G and B color values.

64. The method of claim 49 further comprising the step of mapping into said 3D LUT from three single dimension LUT's.

65. The method of claim 64 wherein said three single dimension LUT's represent a red gain (gR), a green gain (gG) and a blue gain (gB).

66. The method of claim 65 wherein said output primary color values will comprise a gain value and said step of mapping into said 3D LUT comprises mapping to a cube or volume of gain values of said 3D LUT and then determining a final gain value by Tetrahedral Interpolation.

67. The method of claim 66 further comprising the step of multiplying said input signal with said determined gain value.

68. The method of claim 56 further comprising generating the output brightness dynamic range for each pixel depending on the available color bits.

69. A display system for forming an image by combining a multiplicity of light spots, each light spot having a selected color and brightness, said display system comprising:

a light modulator comprising a multiplicity of pixel members for selectively providing at least three selected colors in response to digital data bits from a primary group of bits and a secondary group of bits, each bit of said primary group representing one color of said at least three selected colors and having a selected duration and each bit of said secondary group representing at least one or more colors of said at least three selected colors and having a selected duration;

circuitry for determining an enhanced dynamic range of output gain of the color of a light spot by combining all available bits of said primary group and said secondary group suitable for generating said color of said light spot, said enhanced dynamic range having a first portion extending from a minimum value to an intermediate gain value and a second portion extending from said intermediate gain value to a maximum gain value;

an input signal defining a color and intensity level for each of said at least three selected colors;

circuitry for selecting the appropriate bits from said primary group of digital bits when said input signal requires an output value of said enhanced dynamic range from said first portion to generate light spots of selected colors and of selected intensity;

circuitry for selecting the appropriate light bits from said primary group of bits and said secondary group of bits when said input signal requires an output value of said enhanced dynamic range from said second portion to generate light spots of a selected color and of a selected intensity; and a medium to receive light from said multiplicity of light spots and to display said image.

70. The display system of claim 69 wherein said light modulator is a multiplicity of micro mirrors that switch ON and OFF in response to said digital bits.

71. The display system of claim 70 further comprising a rotating color wheel comprised of sectors of said at least three distinct colors and a light source for projecting light through said rotating color wheel onto said multiplicity of mirrors comprising said light modulator.

72. The display system of claim 71 wherein said color wheel further includes a sector for passing white light therethrough.

73. The display system of claim 70 wherein said primary bits generate a spot of light as said projected light passes wholly through a distinct color of said color wheel, and said secondary bits generate a spot of light as said projected light passes through one or more adjacent distinct colors of said color wheel.

74. The system of claim 69 wherein said at least three selected colors are three colors selected from the group consisting of red, green and blue.

75. The display system of claim 69 further comprising a 3D LUT for storing primary color values for the entire available color volume to be applied to each of the distinct primary colors and circuitry for addressing the appropriate output primary color value in said 3D LUT in response to the input signal.

76. The display system of claim 75 further comprising dynamic range circuitry for providing said secondary digital bits when said brightness input signal requires an output level that is in said second portion of said enhanced dynamic range.

77. The display system of claim 76 wherein said light modulator is a multiplicity of micro mirrors that switch ON and OFF in response to said digital bits.

78. The display system of claim 69 wherein said input signal requires an output value from said second portion of said dynamic range, and further comprising circuitry for identifying the source of said secondary light bits needed to generate said color level, and for providing said secondary light bits from said identified source.

79. The display system of claim 75 wherein said 3D LUT comprises $N^P$ storage locations where "N" is the number of bits making up the input signal, and "P" is the number of primary colors.

80. The display system of claim 75 wherein the input format of said 3D LUT is the intensity level.

81. The display system of claim 75 wherein the inputs to said 3D LUT includes color ratios, and further comprising circuitry for receiving said input signals and generating color ratios therefrom.

82. The display system of claim 81 wherein said color rations comprise ratios of the primary colors red, green and blue.

83. The display system of claim 81 wherein a first input comprising a first ratio F/S and its inverse S/F where "F" is a first color value and "S" is a second color value, a second input comprises a second ratio T/S where "T" is a third color value and a third input represents the maximum signal of the F, S and T color values.

84. The display system of claim 83 wherein said first color is green, said second color is red and said third color is blue.

85. The display system of claim 75 further comprising three single dimension LUT's for mapping into said 3D LUT.

86. The display system of claim 85 wherein said three single dimension LUT's comprise a red LUT, a green LUT and a blue LUT.

87. The display system of claim 85 wherein said three single dimension LUT's represent a red gain (gR), a green gain (gG) and a blue gain (gB).

* * * * *